United States Patent [19]

Miyashita et al.

[11] Patent Number: 5,184,236
[45] Date of Patent: Feb. 2, 1993

[54] TWISTED NEMATIC LIQUID CRYSTAL DISPLAY DEVICE WITH RETARDATION PLATES HAVING PHASE AXIS DIRECTION WITHIN 15° OF ALIGNMENT DIRECTION

[75] Inventors: Takashi Miyashita, Hachioji; Yoshinaga Miyazawa, Fussa; Zenta Kikuchi, Hamura, all of Japan

[73] Assignee: Casio Computer Co., Ltd., Tokyo, Japan

[21] Appl. No.: 739,832

[22] Filed: Aug. 2, 1991

[30] Foreign Application Priority Data

Aug. 10, 1990 [JP] Japan ............................ 2-85308[U]
Sep. 10, 1990 [JP] Japan ............................ 2-239353
Sep. 10, 1990 [JP] Japan ............................ 2-239354

[51] Int. Cl.$^5$ .................... G02F 1/1335; G02F 1/137
[52] U.S. Cl. .......................... 359/63; 359/73; 359/93
[58] Field of Search ........................ 359/63, 73, 93

[56] References Cited

U.S. PATENT DOCUMENTS

| | | | |
|---|---|---|---|
| 4,385,806 | 5/1983 | Fergason | 359/63 |
| 4,436,379 | 3/1984 | Funada et al. | 359/53 |
| 4,652,088 | 3/1987 | Kando et al. | 359/93 |
| 5,107,356 | 4/1992 | Castleberry | 359/63 |
| 5,124,824 | 6/1992 | Kozaki et al. | 359/63 |

FOREIGN PATENT DOCUMENTS 0045037 3/1980 Japan ............................ 359/73
0013916 1/1991 Japan ............................ 359/73

Primary Examiner—William L. Sikes
Assistant Examiner—Anita Pellman Gross
Attorney, Agent, or Firm—Frishauf, Holtz, Goodman & Woodward

[57] ABSTRACT

A liquid crystal display device includes first and second substrates bonded with each other with an annular seal sandwiched therebetween. A liquid crystal is filled in a sealed space between the substates, molecules of which are so aligned that they are twisted at 90°. The value of a product Δnd of the refractive-index anisotropy Δn of a LC layer and the LC layer thickness d falls from 350 nm to 700 nm. A first electrode and a first aligning film executed by an aligning treatment in a predetermined first direction and covering the electrode are formed on an inner surface of the first substrate. Second electrodes and a second aligning film executed by an aligning treatment in a second direction different at 90° from the first direction and covering the electrode are formed on an inner surface of the second substrate. A pair of polarizing plates are disposed outsides of the both substrates, so that a polarizing axis of one plate is directed toward a direction perpendicular to or parallel to the first direction and that of another plate is directed to cross at 90° the former axis. A retardation plate is disposed between the polarizing plates, so that a direction of a delayed or advanced phase axis thereof is equal to or different in a range of ±15° from the first direction. The product Δnd of the retardation plate falls from 300 nm to 600 nm.

19 Claims, 20 Drawing Sheets

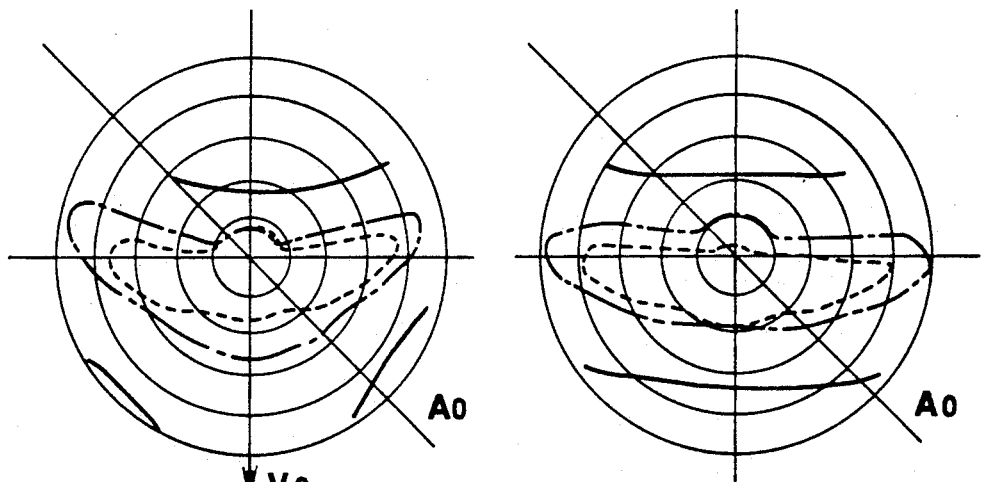
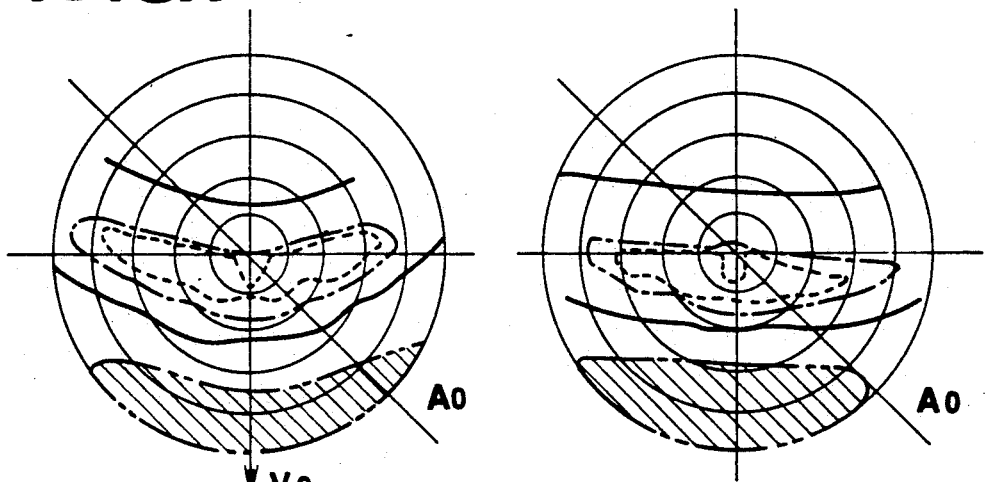
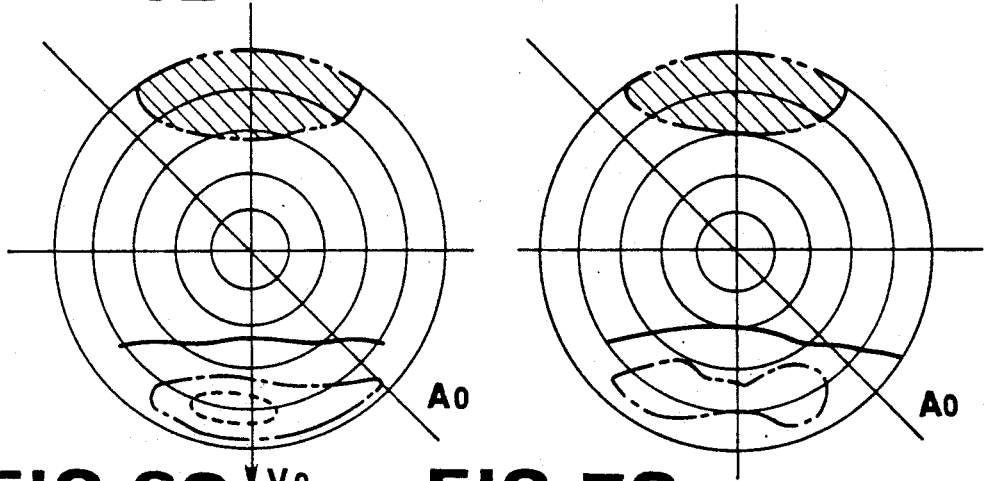

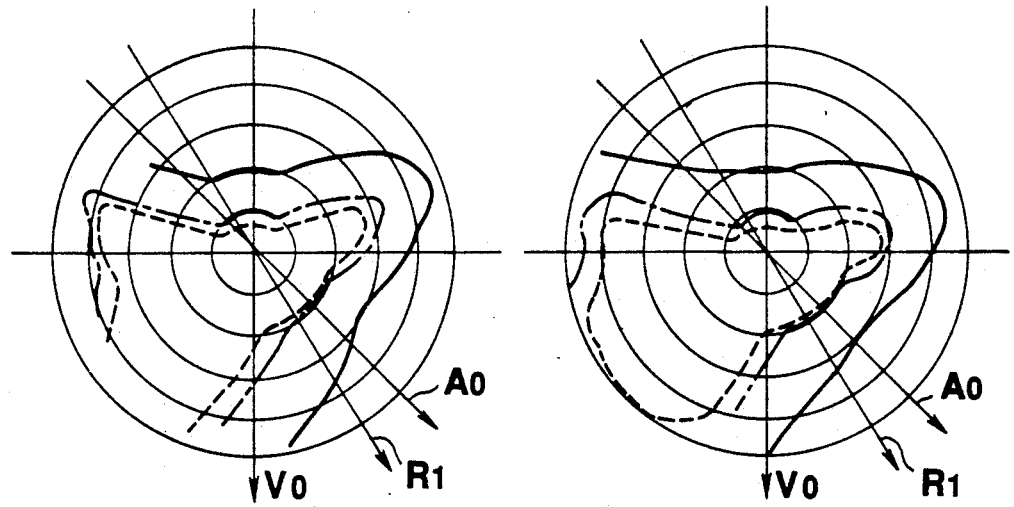
FIG.25A     FIG.26A
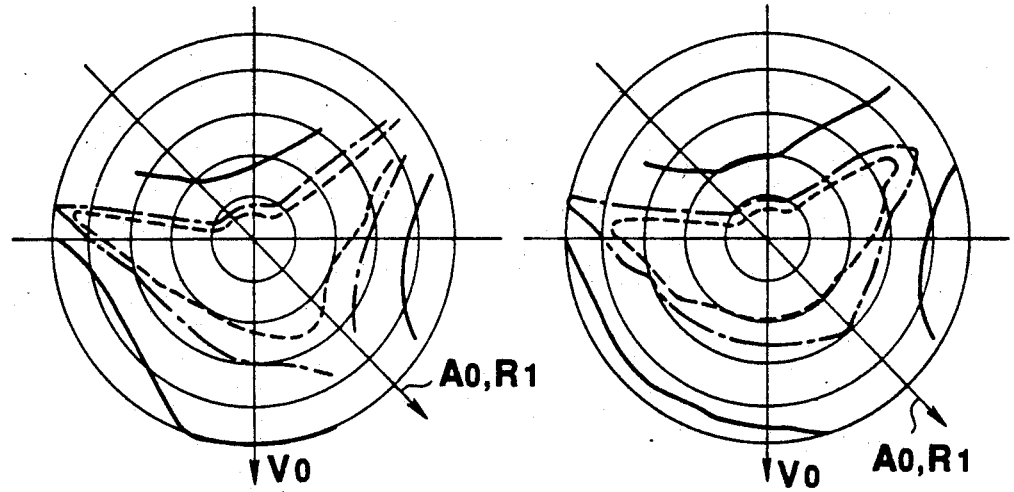
FIG.25B     FIG.26B
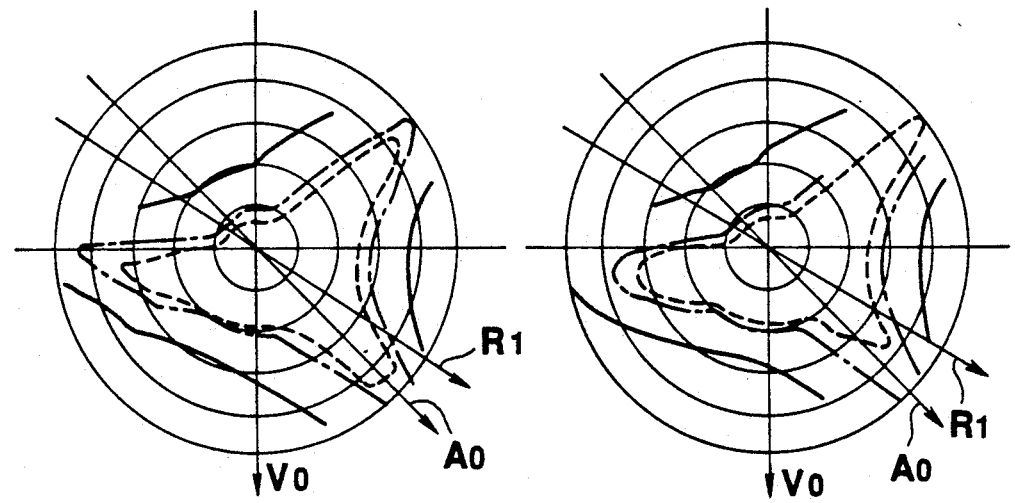
FIG.25C     FIG.26C

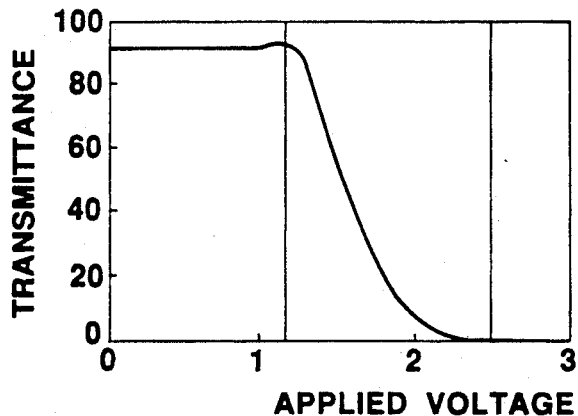
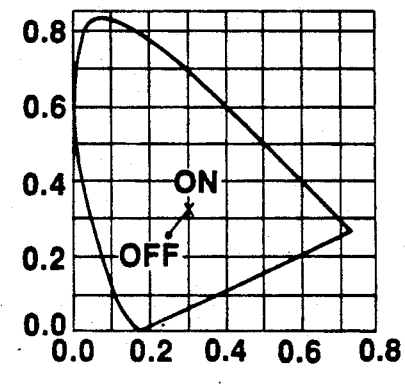
FIG. 30A  FIG. 30B
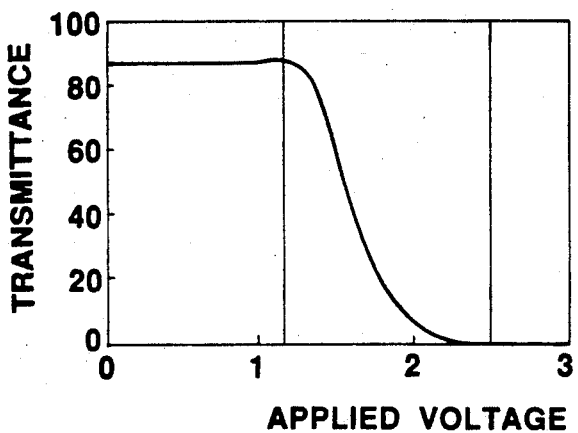
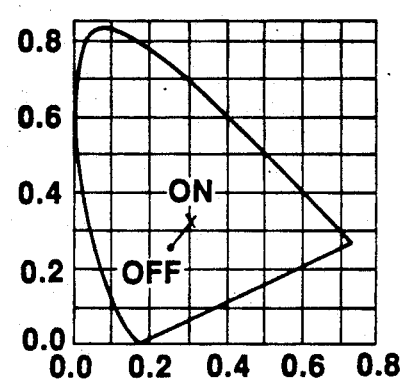
FIG. 31A  FIG. 31B

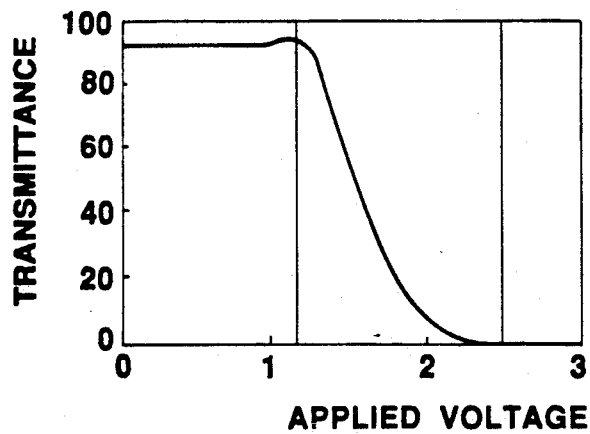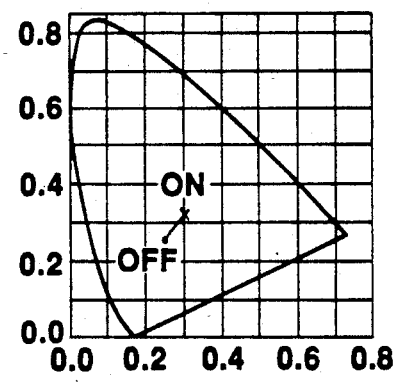
FIG. 32A  FIG. 32B
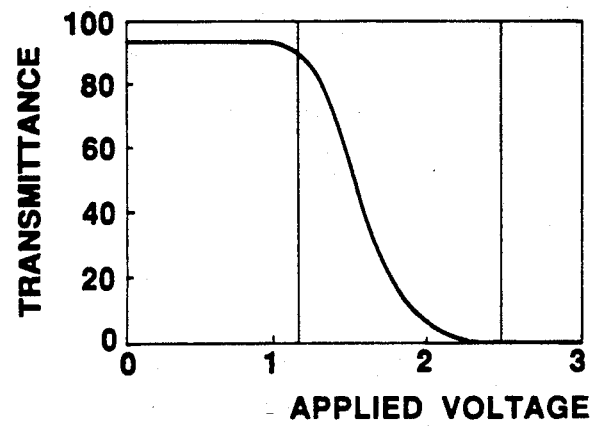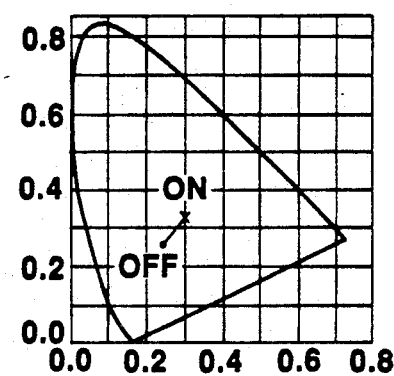
FIG. 33A  FIG. 33B

TWISTED NEMATIC LIQUID CRYSTAL DISPLAY DEVICE WITH RETARDATION PLATES HAVING PHASE AXIS DIRECTION WITHIN 15° OF ALIGNMENT DIRECTION

BACKGROUND OF THE INVENTION

1. Field of the Invention

The present invention relates to a liquid crystal display device and, more particularly, to a twisted nematic type liquid crystal display device.

2. Description of the Related Art

As liquid crystal display devices, a simple matrix type and an active matrix type have been proposed. In the single matrix type, two stripe-like electrode groups are disposed oppositely in parallel with each other with a liquid crystal being disposed therebetween, and are extended to cross each other. A plurality of crossing portions of the two electrode groups, each of which is crossed through the liquid crystal, constitute a plurality of pixels. In the active matrix type, a plurality of matrix-like pixel electrodes, in which thin film transistors are respectively connected to crossing portions thereof, and opposite electrodes, opposed to the pixel electrodes through a liquid crystal, constitute a plurality of pixels at their respective opposing portions.

Recently, active matrix type liquid crystal display devices having thin film transistors (hereinafter referred to as "TFT") have been employed for displays of word processors or personal computers. The liquid crystal display device (hereinafter referred to as "LCD") has a twisted nematic liquid crystal cell having TFTs at respective pixel electrodes, a polarizer disposed at a light incident side of the liquid crystal cell to parallel a transmission axis of the polarizer with a rubbing direction of a substrate at the light incident side of the liquid crystal cell, and an analyzer disposed at a light exit side of the liquid crystal cell to substantially perpendicularly cross a transmission axis of the analyzer over the transmission axis of the polarizer.

Since this conventional TFT-LCD can be statically driven, its contrast is high, and its viewing angle is relatively wide.

The viewing angle characteristic of the conventional TFT-LCD is shown in FIG. 1, its voltage-luminance characteristic is shown in FIG. 2, and change in displayed chromaticity is shown in FIG. 3. FIG. 1 shows equal contrast curves. Five concentric circles sequentially illustrate directions inclined at angles of 10°, 20°, 30°, 40° and 50° with respect to the normal of a display of the TFT-LCD from the center toward the outside. The equal contrast curves show contrasts observed at a rotating angle position, where a clockwise direction (counterclockwise direction in FIG. 1) is positive as seen from the light incident side of the liquid crystal cell with the rubbing direction A of the substrate at the incident light side of the liquid crystal cell used as a reference (0°). A broken curve illustrates a region where the value of the contrast is 100, a one-dot chain line shows a region where the value of the contrast is 50, a solid line illustrate a region where the value of the contrast is 10, and a two-dot chain line shows a region where the value of the contrast is less than 1, i.e., the bright and dark in the display are inverted. The contrast is measured by using a CIE standard light source "C", the value of the contrast is defined by the ratio of Y value of a transmission light, and a front surface contrast is defined as about 100.

As shown by the equal contrast curves, in the conventional TFT-LCD, a direction (viewing angle direction) for obtaining a high contrast is disposed in a direction V of 315° from a rubbing direction of an aligning film formed on the substrate of the light incident side. Therefore, in the TFT-LCD, the direction V is brought into coincidence with the vertical direction of the liquid crystal cell. In the TFT-LCD, the region surrounded by the one-dot chain line and having 50 or more of contrast is relatively wide, and the region surrounded by the solid line and having 10 or more of contrast is also relatively wide. Thus, the TFT-LCD has a better viewing angle characteristic than the conventional simple matrix type liquid crystal device.

However, as shown in FIG. 1, the above-described conventional liquid crystal display device has relatively wide viewing angle in the lateral directions of the liquid crystal display device, but has a disadvantage in that the viewing angle in the vertical direction is narrow. The conventional liquid crystal display device has a relatively large range of a region having less than 1 of the contrast surrounded by the two-dot chain line in a direction in which the liquid crystal display device is observed (from above) as shown in FIG. 1. This region which has 1 or less of the contrast is a region where the brightness and darkness of an image to be displayed are inverted (hereinafter referred to as "an inverted region" and hatched in the attached drawings). In the inverted region, when the liquid crystal display device is observed from a direction inclined at 40° to 50° upward from the normal of the liquid crystal display device, the image is observed like a negative image in which light and shade of the image are inverted, thereby remarkably reducing the display quality of the liquid crystal display device.

Accordingly, it is an object of the present invention to provide a liquid crystal display device in which its viewing angle is improved.

SUMMARY OF THE INVENTION

In order to achieve the above object of the invention, there is provided a liquid crystal display device comprising: a first substrate, on one surface of which at least one first electrode and a first aligning film covering the first electrode are formed, the first aligning film covering at least a portion of the one surface and executed by an aligning treatment in a predetermined first direction; a second substrate, on one surface of which a plurality of second electrodes and a second aligning film covering the second electrodes are formed, the second aligning film covering at least a portion of the one surface and executed by an aligning treatment in a second direction different at substantially 90° with respect to the first direction of the first aligning film of the first substrate; a seal member for bonding the first substrate to the second substrate with a predetermined gap therebetween so that the first electrode on the first substrate is opposed to the second electrodes on the second substrate; a liquid crystal filled in a region, surrounded by the first substrate, the second substrate and the seal member, and forming a liquid crystal layer in the region, in which liquid crystal molecules thereof are aligned in a state that they are twisted at substantially 90°, and the layer has such a refractive-index anisotropy $\Delta n$ and such a liquid crystal layer thickness d that the value of a product $\Delta nd$ of the refractive-index anisotropy Δn and the liquid crystal layer thickness d of the liquid crystal falls from 350 nm to 700 nm; a pair of polarizing plates disposed outside of the first substrate and the second substrate to sandwich them therebetween, a polarizing axis of one polarizing plate being directed toward a direction perpendicular to or parallel to the first direction, and both polarizing axes of the both polarizing plates being directed to cross at substantially right angles to each other; and a retardation plate disposed between the paired polarizing plates so that a direction of one of optical axes thereof is equal to the first direction or different in a range from $-15°$ to $+15°$ from the first direction, and having such a refractive-index anisotropy Δn and such a thickness d that the product Δnd of the refractive-index anisotropy Δn and the thickness d falls from 300 nm to 600 nm.

According to the present invention, at least one retardation plate, one of optical axes thereof being brought into coincidence with or installed in a range from $-15°$ to $+15°$ to the direction of the aligning treatment of the aligning film formed on the substrate adjacent to the retardation plate, is provided between the liquid crystal cell and the polarizing plate. Therefore, the downward viewing angle characteristic of the liquid crystal display device is improved. One or two retardation plates are disposed between the pair of polarizing plates.

When one retardation plate is used, the advanced phase axis of the optical axis of the retardation plate is brought into coincidence with the direction of aligning treatment of the aligning film formed on the substrate adjacent to the retardation plate. The value of the product Δnd of the refractive-index anisotropy Δn and the thickness d of the retardation plate is preferably 300 nm to 500 nm, and more preferably 380 nm when the value of the Δnd of the liquid crystal layer is 300 nm to 600 nm.

When the two retardation plates are used, the direction of the delayed phase axis of the optical axis of either one retardation plate is brought into coincidence with the direction of the aligning treatment of the aligning film formed on the substrate adjacent to the retardation plate, or disposed in a direction different in a range of from $-15°$ to $+15°$ with respect to the direction of the aligning treatment as a reference, and the delayed phase axis of the other one retardation plate is disposed to be crossed the delayed phase axis of the one retardation plate at substantially right angles thereto. In this case, the value of the product Δnd of the refractive-index anisotropy Δnd and the thickness d of the retardation plate is preferably 300 nm to 600 nm when the value of Δnd of the liquid crystal layer is 350 nm to 700 nm, more preferable 300 nm to 400 nm when the value of the Δnd of the liquid crystal layer is 450 nm to 550 nm, and most preferably 400 nm when the value of the Δnd of the liquid crystal layer is 350 nm.

When the two retardation plates are employed, these two retardation plates may be provided between one substrate of the light incident side or the light exit side of the liquid crystal cell and the polarizing plate adjacent to the substrate, or may be disposed at both sides of the liquid crystal cell to sandwich the liquid crystal cell.

When the two retardation plates are disposed in one side of the liquid crystal cell, the value of the product Δnd of the refractive-index anisotropy Δnd and the thickness of the retardation plate is preferably 300 nm to 400 nm when the value of the Δnd of the liquid crystal layer is 300 nm, and more preferably 350 nm when the value of the Δnd of the liquid crystal layer is 510 nm.

When the value of the Δnd of the liquid crystal layer is 375 nm and the value of the Δnd of the retardation plate is 350 nm, it is preferable that the value of the refractive index $n_0$ of the ordinary ray in the retardation plate is 1.3.

When the two retardation plates are disposed to sandwich the liquid crystal cell, the two retardation plates are disposed so that the delayed phase axes of the optical axes of the two retardation plates or the advanced phase axes of the optical axes which cross the delayed phase axes at right angles, are arranged to substantially coincide with the direction of the transmission axis of the adjacent polarizing plate. In this case, when the value of the Δnd of the liquid crystal layer is 350 nm to 400 nm, the value of the Δnd of the retardation plate preferable falls in a range of the values obtained by multiplying the value of the Δnd of the liquid crystal layer by 0.85–0.95.

If the liquid crystal display device of the present invention is applied to the twisted nematic type liquid crystal display device provided with the TFTs, the TFT-LCD has a high contrast and wide viewing angle in the vertical and lateral directions of the liquid crystal cell.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6C are equal contrast curve diagrams respectively showing viewing angle characteristics of the first embodiment of the invention;

FIGS. 7A to 7C respectively show viewing angle characteristics of comparison examples, wherein FIG. 7A is an equal contrast curve diagram of the maximum contrast, FIGS. 7B and 7C are equal contrast curve diagrams of a halftone;

FIGS. 25A to 25C are equal contrast diagrams respectively showing viewing angle characteristics of a liquid crystal display device having the retardation plate arrangement of the second embodiment using a polycarbonate retardation plate having 500 nm of the value of the product $\Delta nd$ (retardation) of the refractive-index anisotropy $\Delta n$ and the thickness d, wherein the installing angle of the delayed phase axis of one of the retardation plates is changed;

FIGS. 26A to 26C are equal contrast diagrams respectively showing viewing angle characteristics of a liquid crystal display device having the retardation plate arrangement of the second embodiment using a polycarbonate retardation plate having 600 nm of the value of the product $\Delta nd$ (retardation) of the refractive-index anisotropy $\Delta n$ and the thickness d, wherein the installing angle of the delayed phase axis of one of the retardation plates is changed;

FIGS. 30A and 30B are a voltage-luminance characteristic diagram of the liquid crystal display device having the retardation plate installing angle of FIG. 29A, and a CIE chromaticity diagram of a transmission light therein;

FIGS. 31A and 31B are voltage-transmittance characteristic diagrams of the liquid crystal display device having the retardation plate installing angle of FIG. 29B, and a CIE chromaticity diagram of a transmission light therein;

FIGS. 32A and 32B are voltage-transmittance characteristic diagrams of the liquid crystal display device having the retardation plate installing angle of FIG. 29C, and a CIE chromaticity diagram of a transmission light therein;

FIGS. 33A and 33B are voltage-transmittance characteristic diagram of the liquid crystal display device having the retardation plate installing angle of FIG. 29D, and a CIE chromaticity diagram of a transmission light therein;

DETAILED DESCRIPTION OF THE PREFERRED EMBODIMENTS

Various embodiments of the present invention will be described in detail with reference to FIGS. 4 to 37.

First Embodiment

A liquid crystal display device of the present invention is achieved by arranging one retardation plate between a liquid crystal cell and one polarization plate. This embodiment will be described in detail by referring to FIG. 4 to FIG. 7C.

Figure 4:
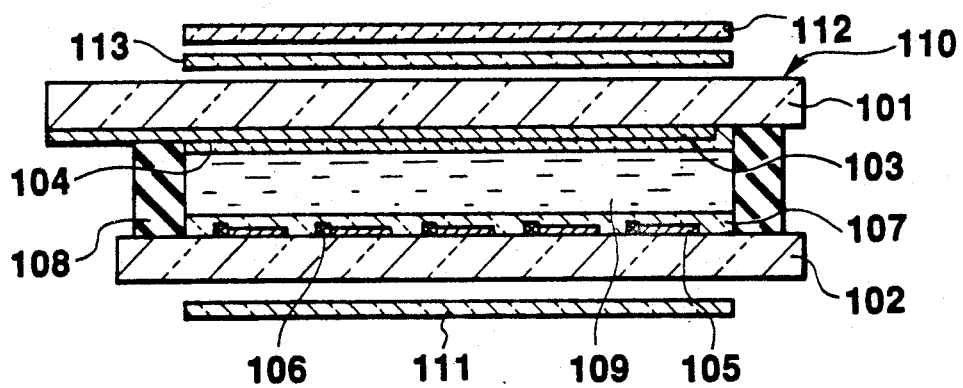
FIG. 4 is a sectional view showing an arrangement of a liquid crystal display device according to a first embodiment of the present invention.
Figure 5:
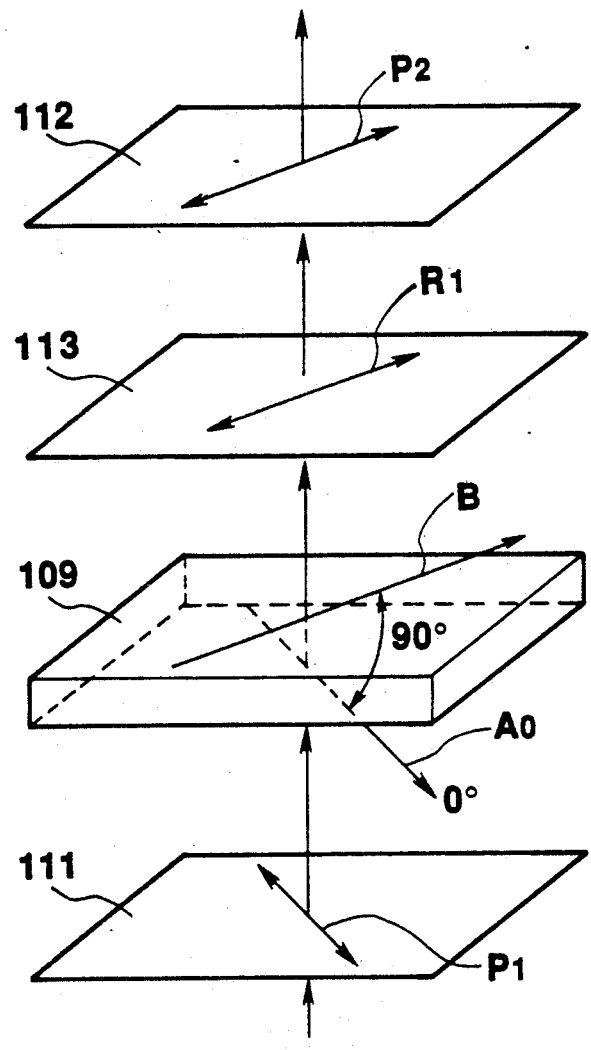
FIG. 5 is a schematic view of an arrangement of a main portion of the first embodiment of the invention.

In FIG. 4 and FIG. 5, an upper substrate 101 and a lower substrate 102 made of transparent glass or the like are disposed oppositely with a predetermined gap therebetween. A transparent common electrode 103 is formed on a lower surface of the upper substrate 101, and a first aligning film 104 is formed on an outer surface of the common electrode 103 and a portion of a display region in the lower surface of the upper substrate 101 except for terminals of the common electrode 103. A plurality of transparent pixel electrodes 105 are arranged in a matrix state on an upper surface of the lower substrate 102, and thin film transistors (TFT) 106 formed on the upper surface of the lower substrate 102 are respectively connected to these pixel electrodes 105. The thin film transistors 106 are respectively connected at their source electrodes to the pixel electrodes 105, at their gate electrodes to gate lines (not shown) formed on the lower substrate 102, and at their drain electrodes to data lines (not shown) formed on the lower substrate 102. These pixel electrodes 105, the TFTs 106, the gate lines and the data lines are covered with a second aligning film 107, which is formed on at least the display region of the lower substrate 102.

The second aligning film 107 of the lower substrate 102 and the first aligning film 104 of the upper substrate 101 are respectively aligned in predetermined directions. As shown in FIG. 5, the second aligning film 107 is rubbed toward a first aligning direction $A_0$ of the right-side forward direction of the lower substrate 102 in FIG. 5, and the first aligning film 104 is rubbed toward a second aligning direction B of the upper rightward direction of the upper substrate 101 in FIG. 5. These first aligning direction $A_0$ and the second aligning direction B are crossed substantially at 90°.

The upper substrate 101, on which the common electrode 103 is formed, and the lower substrate 102, on which the pixel electrodes 105 are formed, are bonded with each other through an annular seal member 108 with a predetermined gap therebetween.

A nematic liquid crystal material 109 is filled in a space surrounded by the lower substrate 102, the upper substrate 101 and the seal member 108. Since the liquid crystal molecules in the liquid crystal material 109 are respectively directed in the first and second aligning directions $A_0$, B at regions near the first and second aligning films 104 and 107 and the first aligning direction $A_0$ and the second aligning direction B are different substantially at 90°, the liquid crystal molecules are aligned in the liquid crystal material 109 to be twisted substantially at 90° in a counterclockwise direction from the first aligning direction $A_0$ of the lower substrate 102 toward the second aligning direction B of the upper substrate 101.

Refractive-index anisotropy $\Delta n$ of the liquid crystal material 109 and its layer thickness d are so determined that the value of a product $\Delta nd$ (retardation) of the refractive-index anisotropy $\Delta nd$ and the layer thickness d becomes 380 nm, and a liquid crystal layer is formed between the first aligning film 104 and the second aligning film 107. The lower substrate 102, the upper substrate 101, and the liquid crystal layer interposed between these substrates 102, 101 forms a liquid crystal cell 110.

A polarizer 111 is provided outside of the lower substrate 102 of the liquid crystal cell 110, and an analyzer 112 is disposed outside of the upper substrate 101 of the liquid crystal cell 110. A transmission axis $P_1$ of the polarizer 111 is disposed substantially parallel to the first aligning direction $A_O$, and a transmission axis $P_2$ is disposed substantially parallel to the transmission axis $P_1$ of the polarizer 111.

A retardation plate 113 is disposed between the upper substrate 101 and the analyzer 112 such that its delayed phase axis $R_1$ and optical axis thereof cross the first aligning direction $A_0$ at substantially 90°. The retardation plate 113 is made of polycarbonate, and has a refractive-index anisotropy $\Delta n$ and a thickness d so that the value of the product $\Delta nd$ of the refractive-index anisotropy $\Delta n$ and the thickness d becomes 350 nm.

In the first embodiment described above, the retardation plate 113 having 350 nm as the value of the $\Delta nd$ is disposed between the liquid crystal cell 110 and the polarizer 111, thereby improving its viewing angle characteristic.

FIG. 6A to FIG. 6C show equal contrast curve diagrams of the viewing angle characteristic of the liquid crystal display device according to the first embodiment of the present invention. As comparative ones, FIG. 7A to FIG. 7C show equal contrast curves of a liquid crystal display device in which only the retardation plate 113 is removed from the arrangement of the liquid crystal display device of the first embodiment.

FIG. 6A and FIG. 7A show equal contrast curves of the maximum contrasts, which is obtained by dividing the maximum luminance with the minimum luminance. FIG. 6B and FIG. 7B show equal contrast curves of halftones to the minimum luminance, which is obtained by dividing the intermediate luminance with the minimum luminance. FIGS. 6C and 7C show equal contrast curves of the halftones to the maximum luminance, which is obtained by dividing the maximum luminance with the intermediate luminance.

In these equal contrast curve diagrams, $A_0$ denotes the first aligning direction, and five concentric circles respectively illustrate directions inclined sequentially at 10°, 20°, 30°, 40° and 50° with respect to the normal of the liquid crystal display device from the center toward the outside. A broken line denotes contrast 100, an one-dot chain line denotes contrast 50, a solid line denotes contrast 10, and a two dot chain line denotes contrast less than 1, i.e., illustrating that light and shade of the display are inverted. The contrast is measured by using a CIE standard light source "C", the value of the contrast is defined by the ratio of the Y value of the transmission light, and its front surface contrast is set to approximately 100.

As apparent from comparing FIG. 6A to FIG. 7A FIG. 6B to FIG. 7B, and FIG. 6C to FIG. 7C, in all the equal contrast curves, a region having high contrast is extended in a direction $V_0$ which is rotated at 315° in a counterclockwise direction from the first aligning direction $A_0$ of the liquid crystal display device of the first embodiment shown in FIG. 6A to FIG. 6C (i.e., at this side of the liquid crystal display device shown in FIGS. 4 and 5). In comparison with the conventional liquid crystal display device shown in FIG. 1, the region having high contrast at the maximum contrast and intermediate luminance is extended at this side of the liquid crystal display device having the retardation plate of the first embodiment.

Therefore, the viewing angle at this side of the liquid crystal display device of the liquid crystal display device according to the first embodiment can be improved.

In the first embodiment, it is preferable that the value of the $\Delta nd$ of the liquid crystal cell is 380 nm and the value of the $\Delta nd$ of the retardation plate is 350 nm.

In this first embodiment, the retardation plate is disposed at the light exit side. However, the present invention is not limited to this particular embodiment. For example, the retardation plate may be disposed at the light incident side. In this case, the retardation plate 113 may be disposed between the polarizer 111 and the lower substrate 102, so that the viewing angle characteristic is improved similarly to the first embodiment described above.

Second Embodiment

In this embodiment, two retardation plates are provided between a pair of polarizing plates. A second embodiment, in which two retardation plates are provided at one side of a liquid crystal cell, will be described in detail by referring to FIG. 8 to FIG. 27F. The same members as those of the first embodiment are denoted by the same reference numerals, and the detailed description thereof will be omitted.

Figure 8:
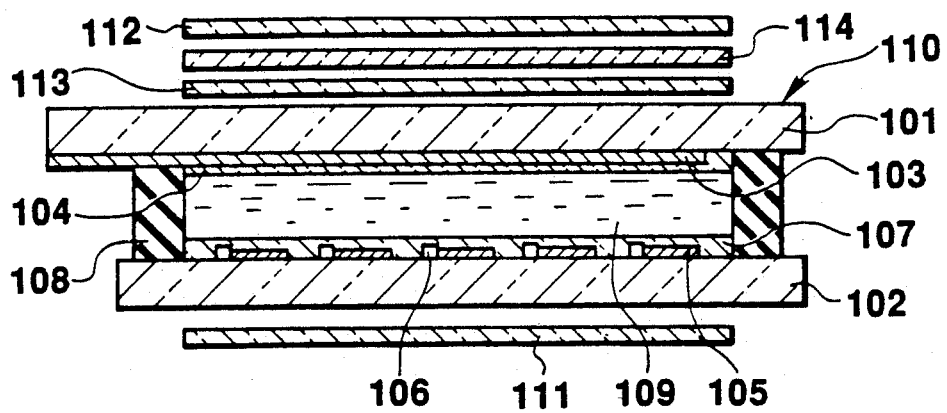
FIG. 8 is a sectional view showing an arrangement of a liquid crystal display device according to a second embodiment of the present invention.
Figure 9:
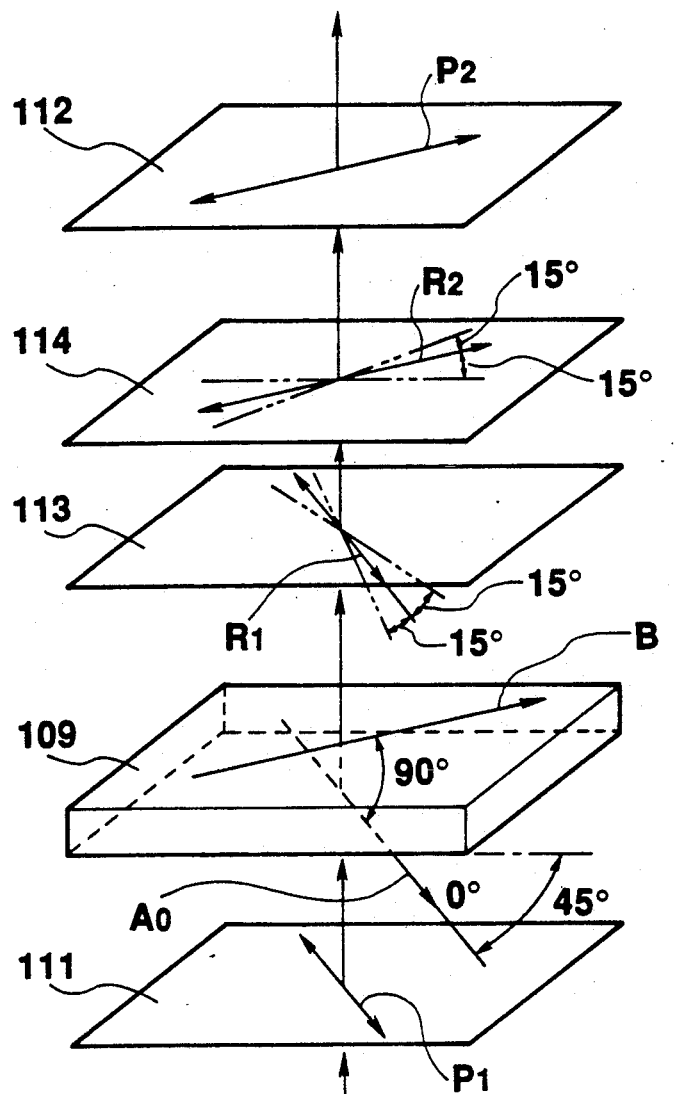
FIG. 9 is a schematic view of an arrangement of a main portion of the second embodiment of the invention.

As shown in FIG. 8 and FIG. 9, a polarizer 111 formed of a linear polarizing plate is provided at the light incident side of a liquid crystal cell 110, and an analyzer 112 formed of a linear polarizing plate is provided at the light exit side of the liquid crystal cell 110. First and second retardation plates 113 and 114 are provided between the liquid crystal cell 110 and the analyzer 112. This liquid crystal cell 110 has the similar construction as that of the first embodiment. On a lower substrate 102, pixel electrodes 105, TFTs 106 provided respectively to the pixel electrodes 105, and a second aligning film 107 covering the pixel electrodes 105 and the TFTs 106 are formed. On an upper substrate 101, a common electrode 103 opposed to the pixel electrodes 105 on the lower substrate 102, and a first aligning film 104 covering the common electrode 103 are formed. A liquid crystal, sealed between the upper substrate 101 and the lower substrate 102, has such properties that the value of dielectric constant ratio $\Delta\epsilon/\epsilon\perp$ is 2.44, the value of elastic constant ratio $K_3/K_1$ is 1.43, and the value of $K_3/K_2$ is 2.50, and the value of the $\Delta nd$ (retardation) thereof is set in a range of 450 nm to 550 nm. The aligning direction of the aligning film 107 of the lower substrate 102 of the light incident side in the liquid crystal cell 110 is rubbing direction $A_0$ of approximately 45° with respect to the side edge of the liquid crystal cell 110. The aligning direction of the aligning film 103 of the upper substrate 101 in the light exit side is a rubbing direction B rotated at 90° in a counterclockwise direction from the rubbing direction $A_0$ of the aligning film 107 of the lower substrate 102, as viewed from the light incident side. Therefore, the liquid crystal 104 sandwiched between the opposed upper and lower substrates 101 and 102 is twisted at substantially 90° in a counterclockwise direction as seen from the light incident side. The value of the d/p (thickness/natural pitch of a liquid crystal material) of the liquid crystal layer in this example is set to approx. 0.05. The pretilting angle of the liquid crystal molecules is approx. 1°.

Figure 10:
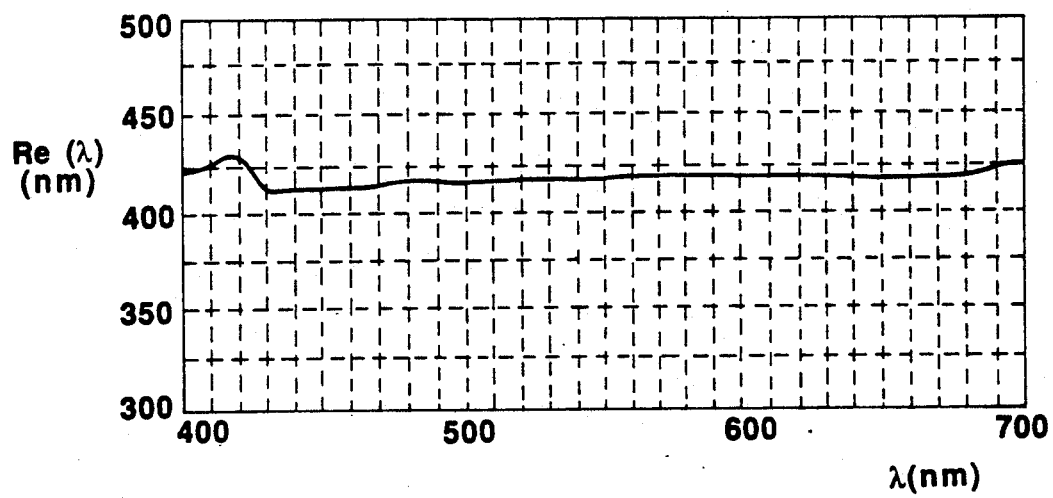
FIG. 10 is a graph showing wavelength dependency of retardation Re of a retardation plate, the retardation plate being formed of polyvinyl alcohol and used for the present invention.
Figure 11:
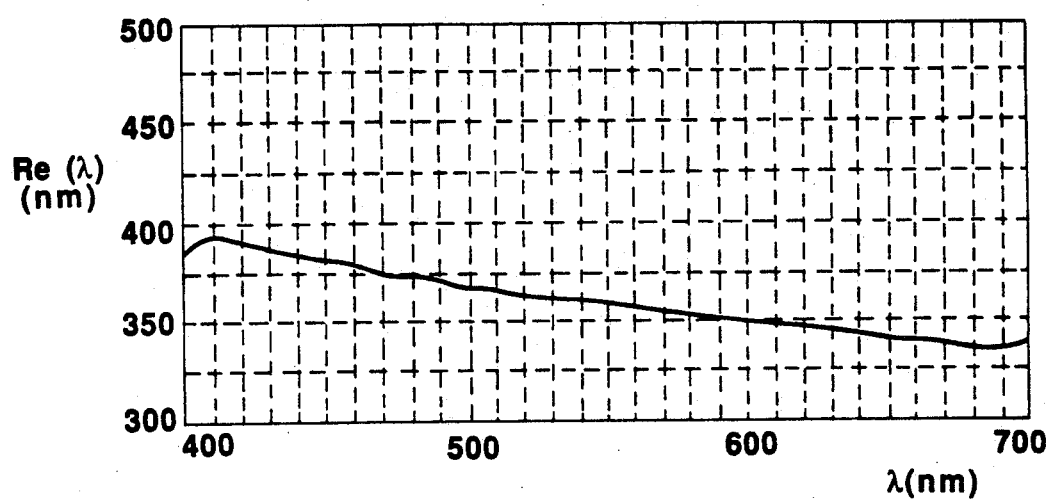
FIG. 11 is a graph showing wavelength dependency of retardation Re of a retardation plate, the retardation plate being formed of polycarbonate and used for the present invention.

A polarizing axis (e.g., a transmission axis $P_1$) of the polarizer 111 is arranged substantially parallel to the rubbing direction $A_0$ of the lower substrate 102 of the liquid crystal cell 110. A polarizing axis (e.g., a transmission axis $P_2$) of the analyzer 112 is arranged perpendicularly to the transmission axis $P_1$ of the polarizer 111. The first and second retardation plates 113 and 114 are so arranged that delayed phase axes $R_1$ and $R_2$ are crossed perpendicularly with each other. These retardation plates 113 and 114 are formed to have the same value of $\Delta nd$, and the value of the $\Delta nd$ is set in a range of 300 nm to 400 nm. These retardation plates 113 and 114 are formed of the same material such as, for example, polycarbonate (PC) or polyvinyl alcohol (PVA), the outer surfaces of which are covered by a protective film made of triacetyl cellulose or the like. The retardation plate having such a structure that the polyvinyl alcohol plate is covered by the protective film of the triacetyl cellulose has, as shown in FIG. 10, almost no wavelength dependency of Re (retardation). In comparison to this, since the polycarbonate contains a phenyl group, the retardation plate formed of the polycarbonate has high wavelength dependency of Re, as shown in FIG. 11.

In this liquid crystal display device, since the delayed phase axes $R_1$ and $R_2$ of the first and second retardation plates 113 and 114 are disposed to cross with each other at 90°, no retardation is generated in light in the normal direction of the liquid crystal cell 110, but a retardation is generated in light incident from an oblique direction to the normal of the liquid crystal cell 110. The retardation difference of the retardation plates compensates for the difference in the $\Delta nd$ of the liquid crystal cell 110 for the light transmitted in the normal direction of the liquid crystal cell 110 and the light transmitted in the oblique direction of the liquid crystal cell 110, so that the reduction in the contrast is prevented when the display surface is observed from the oblique direction, thereby improving the viewing angle characteristic.

In the liquid crystal display device constructed as described above, the contrasts observed in the following directions are measured in a state that the value of the $\Delta nd$ of the liquid crystal cell 110 is set to 510 nm (the value measured by the light having a wavelength of 589 nm), the value of each of the $\Delta nd$ of the retardation plates 113 and 114 is set to 350 nm (the value measured by the light having a wavelength of 589 nm), the delayed phase axes $R_1$ and $R_2$ of the first and second retardation plates 113 and 114 cross each other at 90°, and the delayed phase axis $R_1$ of the first retardation plate 103 is disposed at angles of 0°, ±15°, and ±30°. Here, the clockwise direction from the rubbing direction $A_0$ [used as a reference (0°)] of the lower substrate 102 of the light incident side of the liquid crystal cell 110, is defined to be positive as seen from the light incident side. The results are respectively shown in equal contrast curve diagrams of FIG. 12A to FIG. 12E. The equal contrast curve diagram shown in each of FIG. 12A to FIG. 12E is defined similarly to each of FIG. 6A to FIG. 6C of the first embodiment described above.

Figure 1:
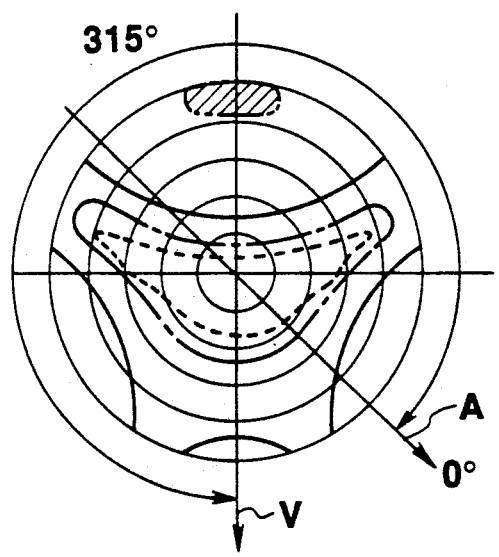
FIG. 1 is an equal contrast diagram showing viewing angle characteristics of a conventional liquid crystal display device.
Figure 12A:
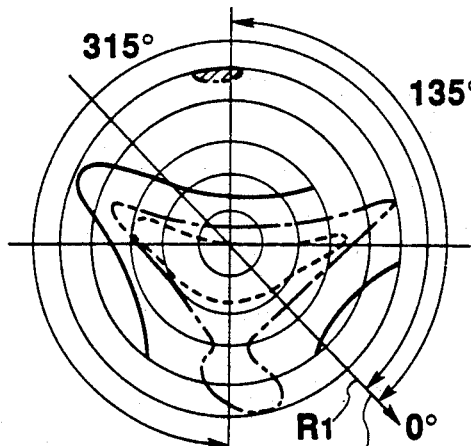
FIGS. 12A to 12E are equal contrast diagrams respectively showing viewing angle characteristics of the liquid crystal display device having the retardation plate arrangement of the second embodiment, wherein the installing angle of the delayed phase axis of one of the retardation plates is changed.

In comparison with the conventional example shown in FIG. 1, in a case where the installing angle of the delayed phase axis $R_1$ of the first retardation plate 113 is 0°, as shown in FIG. 12A, a region of 50 or more of contrast surrounded by a one-dot chain line is extended in the vertical direction $V_0$ (a viewing angle direction of 315° from the rubbing direction $A_0$) of the liquid crystal display device, and an inverted region surrounded by a two-dot chain line in the vertical direction $V_0$ of the liquid crystal display device is narrowed, thereby improving its viewing angle characteristic.

Figure 12D:
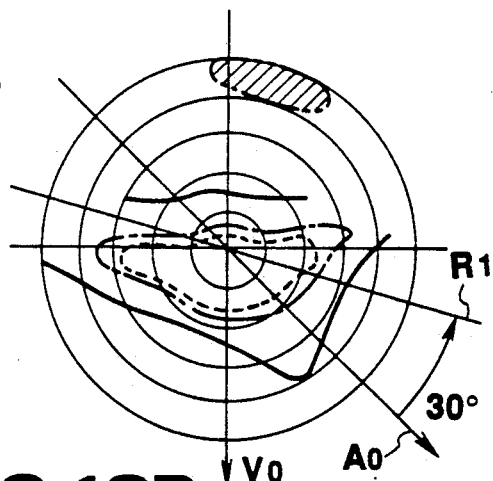
Figure 12B:
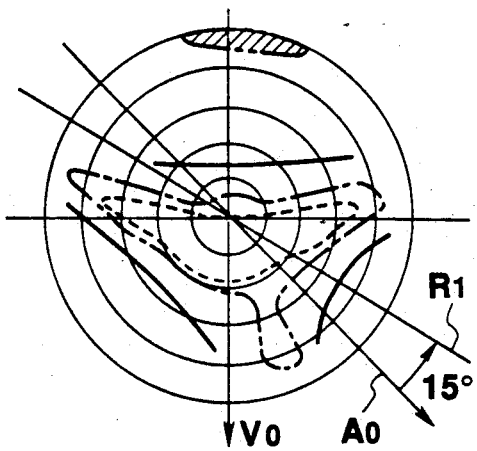

In comparison with the conventional example shown in FIG. 1, in a case where the installing angle of the delayed phase axis $R_1$ of the first retardation plate 113 is 15°, as shown in FIG. 12B, a region having 50 or more of contrast surrounded by a one-dot chain line is extended downward in the liquid crystal cell, thereby improving its viewing angle characteristic.

Figure 12E:
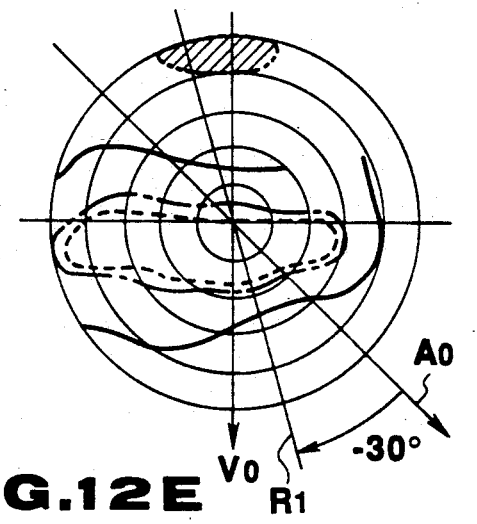
Figure 12C:
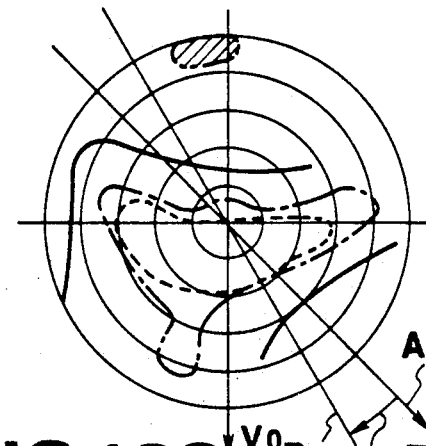

In comparison with the conventional example shown in FIG. 1, in a case where the installing angle of the delayed phase axis $R_1$ of the first retardation plate 113 is −15°, as shown in FIG. 12C, a region having 50 or more of contrast surrounded by a one-dot chain line is extended downward in the liquid crystal cell, and an inverted region surrounded by a two-dot chain line and located at an upward region in the liquid crystal cell is narrowed, thereby improving its viewing angle characteristic.

In comparison with the conventional example shown in FIG. 1, in a case where the installing angle of the delayed phase axis $R_1$ of the first retardation plate 113 is 30°, as shown in FIG. 12D, a region having 50 or more of contrast surrounded by a one-dot chain line is narrowed in the vertical direction $V_0$ of the liquid crystal cell, and an inverted region surrounded by a two-dot chain line and located at an upward region in the liquid crystal cell is substantially the same, thereby improving no viewing angle characteristic.

In comparison with the conventional example shown in FIG. 1, in a case where the installing angle of the delayed phase axis $R_1$ of the first retardation plate 113 is −30°, as shown in FIG. 12E, a region having 50 or more of contrast surrounded by a one-dot chain line is narrowed in the vertical direction $V_0$ of the liquid crystal cell, and an inverted region surrounded by a two-dot chain line and located at an upward region in the liquid crystal cell is substantially the same, thereby improving no viewing angle characteristic.

From the above description, in a case where the installing angle of the delayed phase axis $R_1$ of the first retardation plate 113 is in a range of −15° to +15° with respect to the aligning direction $A_0$ of the lower substrate 102 of the light incident side of the liquid crystal cell 110, a viewing angle having highest contrast exists in the vertical direction $V_0$ of the liquid crystal cell 110, and the range to be observed with the high contrast is extended. Therefore, it is preferable that the installing angle of the delayed phase axis $R_1$ of the first retardation plate 113 is in a range of −15° to +15° with respect to the aligning direction $A_0$.

In the range of the installing angle of the delayed phase axis $R_1$ of the first retardation plate 113 as described above, the retardation generated by the fact that the light is transmitted obliquely through the liquid crystal cell 110 is compensated by the first and second retardation plates 113 and 114, so that the viewing angle extends in the vertical direction $V_0$ and the lateral direction perpendicular to the vertical direction of the liquid crystal display device, the inverted region located at an upward region in the liquid crystal cell is reduced, and its viewing angle characteristic is improved.

In the second embodiment described above, the two retardation plates are arranged between the liquid crystal cell 110 and the analyzer 112. However, even if the two retardation plates are arranged between the polarizer 111 and the liquid crystal cell 110 as shown in FIG.

13, the viewing angle characteristic can be improved substantially in the same degree as the case of the second embodiment described above. More particularly, when the first retardation plate 113 is arranged between the polarizer 111 and the liquid crystal cell 110 to set its delayed phase axis $R_1$ in a range of $-15°$ to $+15°$ with respect to the rubbing direction $A_0$ of the lower substrate 102 of the light incident side of the liquid crystal cell 110 and the second retardation plate 114 is arranged between the first retardation plate 113 and the liquid crystal cell 110 to set its delayed phase axis $R_2$ to cross perpendicularly with the delayed phase axis $R_1$ of the first retardation plate 113, the viewing angle characteristic is improved substantially in the same degree as the second embodiment described above.

Figure 14:
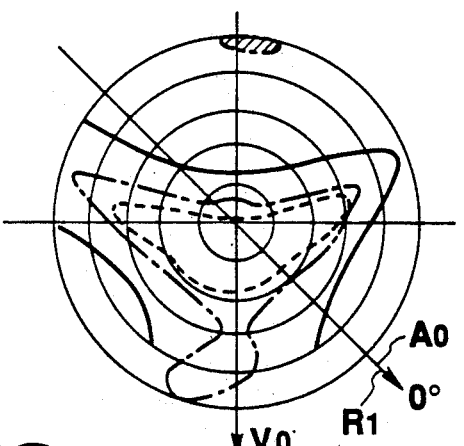
FIG. 14 is an equal contrast diagram showing viewing angle characteristics of a liquid crystal display device having the retardation plate arrangement shown in FIG. 13.
Figure 13:
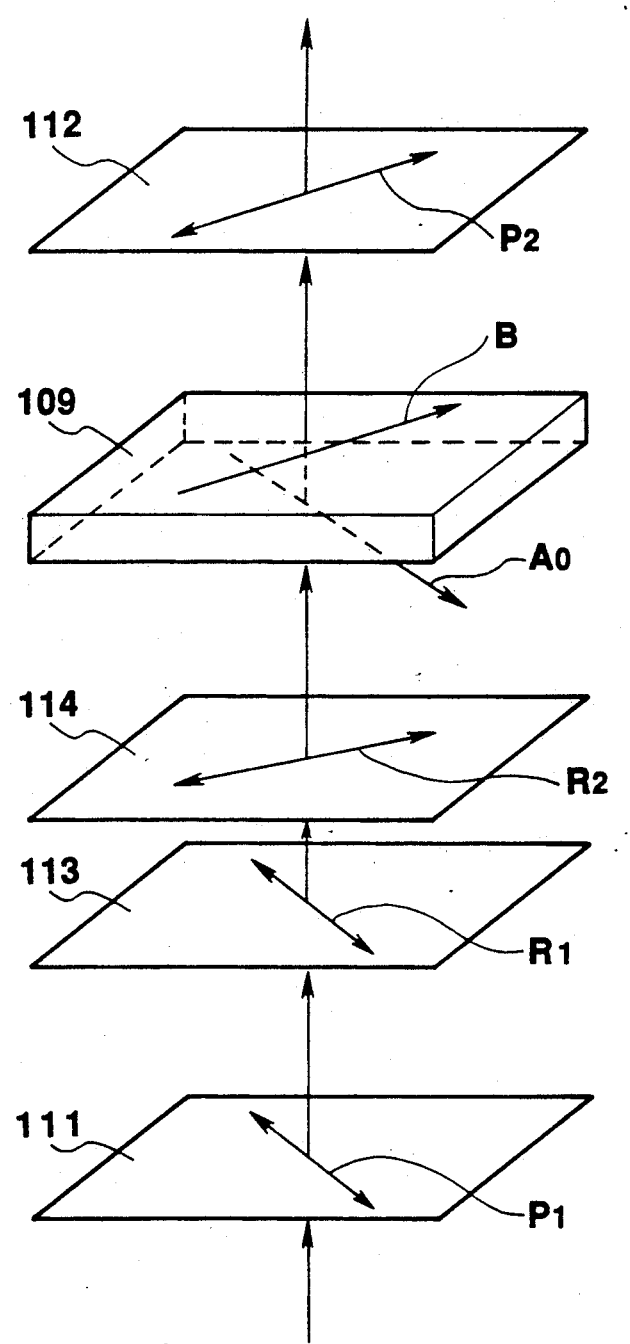
FIG. 13 is a schematic view of an arrangement of the retardation plate different from that of the retardation plate in the second embodiment of FIG. 8.

The measured results of the contrast observed from all the directions under the sam conditions as those of the above-described second embodiment by bringing the installing direction of the delayed phase axis $R_1$ of the first retardation plate 113 arranged at the polarizer 111 side into coincidence with the rubbing direction $A_0$ are shown in FIG. 14. As compared with the equal contrast curve of FIG. 12A described above, the equal contrast curves of FIG. 14 have a mirror-symmetry with respect to the plane passing through the direction of 135° and the direction of 315°, both direction being based on the aligning direction $A_0$ of the lower substrate 102 of the light incident side of the liquid crystal cell 110.

Similarly, in a case that the two retardation plates 113 and 114 are arranged between the polarizer 111 and the liquid crystal cell 110 and the first retardation plate 113 is disposed so that its delayed phase axis $R_1$ is directed in a range of $-15°$ to $+15°$ with respect to the rubbing direction $A_0$, an equal contrast curve having a mirror-symmetry to a plane passing through the direction of 135° and the direction of 315°, both directions being based on the rubbing direction $A_0$, is obtained as compared with the case where the two retardation plates 113 and 114 are arranged between the liquid crystal cell 110 and the analyzer 112 as shown in FIG. 14 described above.

Therefore, when the installing angle of the delayed phase axis $R_1$ of the first retardation plate 113 arranged at the side of the polarizer 111 is set in a range of $-15°$ to $+15°$ even in a case where the two retardation plates 113 and 114 are arranged between the polarizer 111 and the liquid crystal cell 110 to cross their delayed phase axes $R_1$, $R_2$ to each other at 90°, its viewing angle can be extended, its inverted region can be narrowed, and its viewing angle characteristic is improved.

In the liquid crystal display device according to the second embodiment of the arrangement shown in FIG. 8 and FIG. 9, the contrasts observed from all the directions are measured in the following example in which the value of $\Delta nd$ of the liquid crystal layer of the liquid crystal cell 110 is set to 360 nm (the value measured by a light having a wavelength of 589 nm), the value of $\Delta nd$ of each of the retardation plates 113 and 114 is set to 300 nm, 350 nm and 400 nm (the value measured by a light having a wavelength of 589 nm), and the delayed phase axis $R_1$ of the first retardation plate 113 is disposed at angles of 0° and $\pm15°$ by the similar method as that of FIGS. 12A to 12E. The measured results are shown in FIG. 15A to FIG. 17C.

Figure 15A:
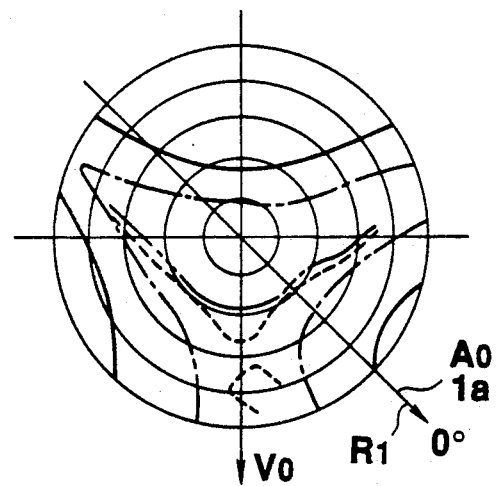
FIGS. 15A to 15C are equal contrast diagrams respectively showing viewing angle characteristics of a liquid crystal display device having the retardation plate arrangement of the second embodiment using a retardation plate having 300 nm of the value of the product $\Delta nd$ (retardation) of the refractive-index anisotropy $\Delta n$ and the thickness d, wherein the installing angle of the delayed phase axis of one of the retardation plates is changed.
Figure 16A:
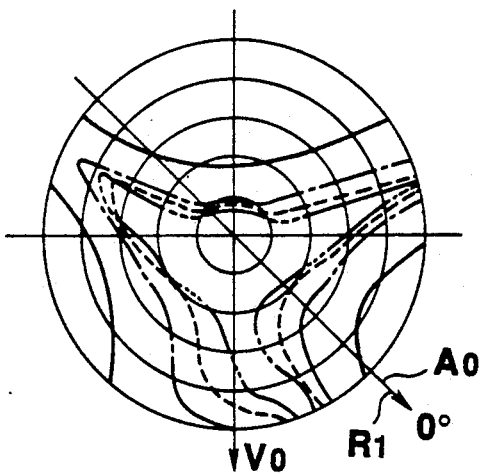
FIGS. 16A to 16C are equal contrast diagrams respectively showing viewing angle characteristics of a liquid crystal display device having the retardation plate arrangement of the second embodiment using a retardation plate having 350 nm of the value of the product $\Delta nd$ (retardation) of the refractive-index anisotropy $\Delta n$ and the thickness d, wherein the installing angle of the delayed phase axis of one of the retardation plates is changed.
Figure 15B:
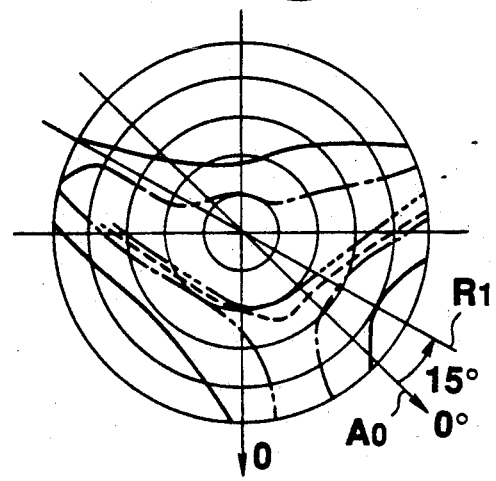
Figure 16B:
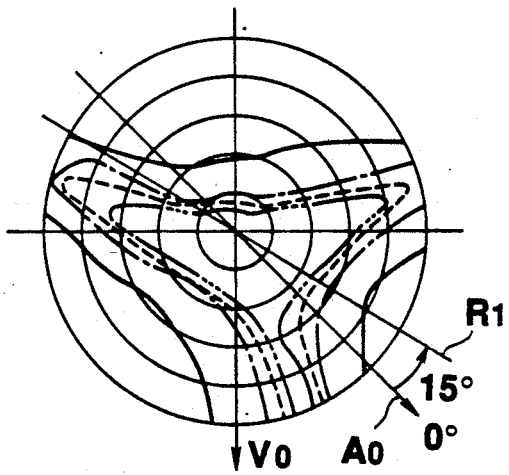
Figure 15C:
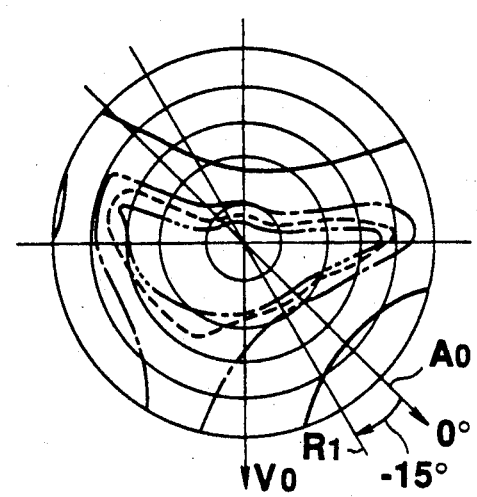
Figure 16C:
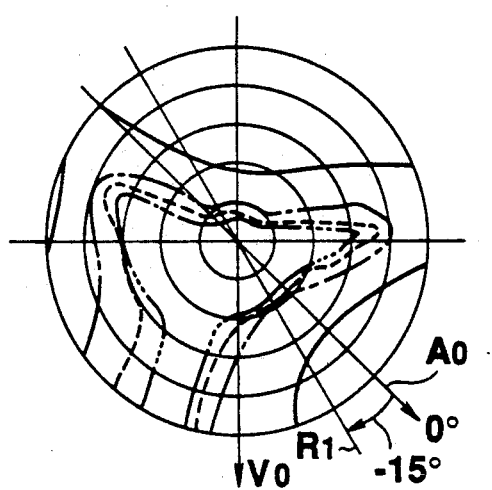
Figure 17A:
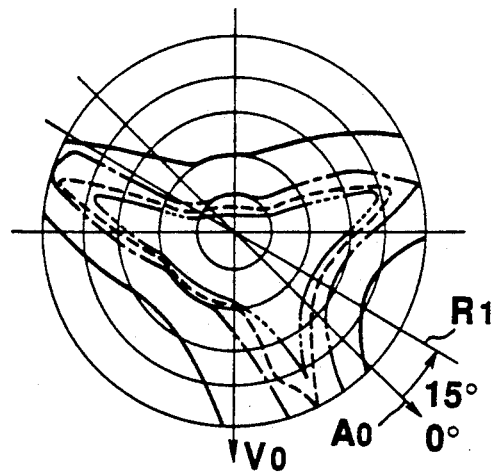
FIGS. 17A to 17C are equal contrast diagrams respectively showing viewing angle characteristics of a liquid crystal display device having the retardation plate arrangement of the second embodiment using a retardation plate having 400 nm of the value of the product $\Delta nd$ (retardation) of the refractive-index anisotropy $\Delta n$ and the thickness d, wherein the installing angle of the delayed phase axis of one of the retardation plates is changed.
Figure 17B:
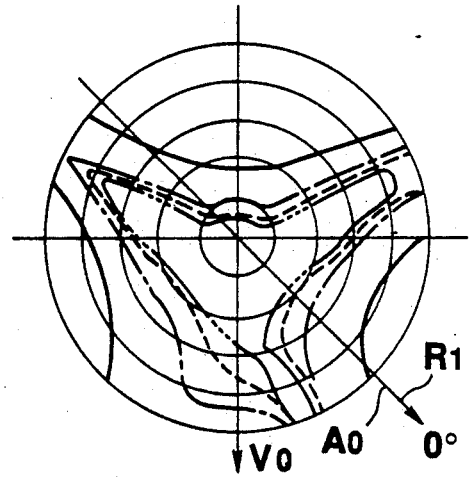
Figure 17C:
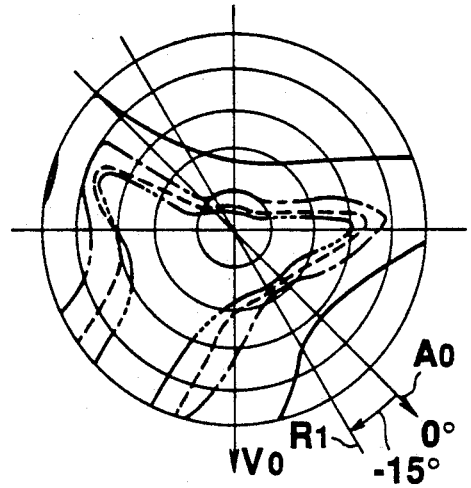

FIG. 15A to FIG. 15C are equal contrast curve diagrams of the cases where the value of $\Delta nd$ of each of the retardation plates 113 and 114 is 300 nm, and the installing angle of the delayed phase axis $R_1$ of the first retardation plate 113 is 0°, 15° and $-15°$. FIG. 16A to FIG. 16C are equal contrast curve diagrams of the cases where the value of $\Delta nd$ of each of the retardation plates 113 and 114 is 350 nm, and the installing angle of the delayed phase axis $R_1$ of the first retardation plate 113 is 0°, 15° and $-15°$. And, FIG. 17A to FIG. 17C are equal contrast curve diagrams of the cases where the value of $\Delta nd$ of each of the retardation plates 113 and 114 is 400 nm, and the installing angle of the delayed phase axis $R_1$ of the first retardation plate 113 is 0°, 15° and $-15°$. The physical properties of the liquid crystal in these cases are so set that the value of dielectric constant ratio $\Delta\epsilon/\epsilon_\perp$ is 1.25, elastic constant ratio $K_3/K_1$ is 1.57 and $K_3/K_2$ is 2.30. In FIG. 15A to FIG. 17C, a three-dot chain line shows contrast 150.

In comparison with the conventional example shown in FIG. 1, as is apparent from these drawings, in all the cases no inverting region is exhibited, and the region having 50 or more of contrast surrounded by the one-dot chain line is extended downward in the liquid crystal cell. It is apparent that the region having high contrast is exhibited downward in the liquid crystal cell. Therefore, the viewing angle extends in the vertical direction in the liquid crystal cell, and the viewing angle characteristic is improved. Further, the larger the value of the $\Delta nd$ of each of the retardation plates 113 and 114 is, the wider the region having high contrast is downward in the liquid crystal cell 110. Therefore, it is preferable that the value of the $\Delta nd$ of each of the retardation plates is larger, and it is preferable that the value is in a range of 300 nm to 600 nm. It is also preferable that the value of the $\Delta nd$ of the liquid crystal cell 110 is in a range of 350 nm–700 nm, and particularly, the smaller the value is, the better the viewing angle characteristic becomes. Therefore, the value of the $\Delta nd$ of the liquid crystal cell is preferably 550 nm or less and particularly approx. 360 nm. In the case where the two retardation plates are arranged between the polarizer 111 and the liquid crystal cell 110 to cross each other at 90°, the characteristic is the same as described above.

Figure 18A:
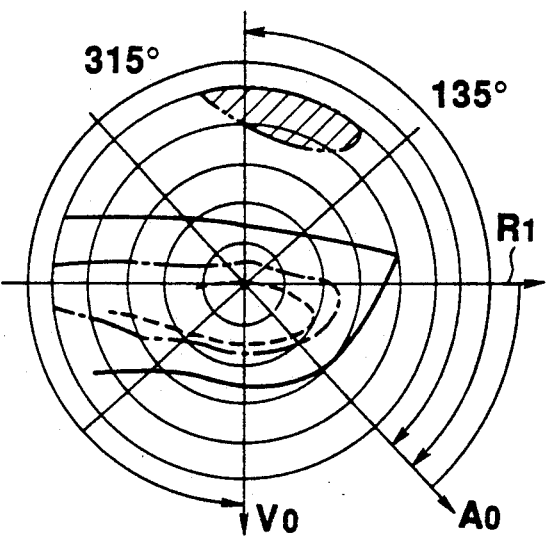
FIGS. 18A to 18C are equal contrast diagrams respectively showing viewing angle characteristics of a liquid crystal display device having the retardation plate arrangement of the second embodiment, wherein the installing angle of the delayed phase axis of one of the retardation plates is different from that of FIGS. 12A to 12E.
Figure 18B:
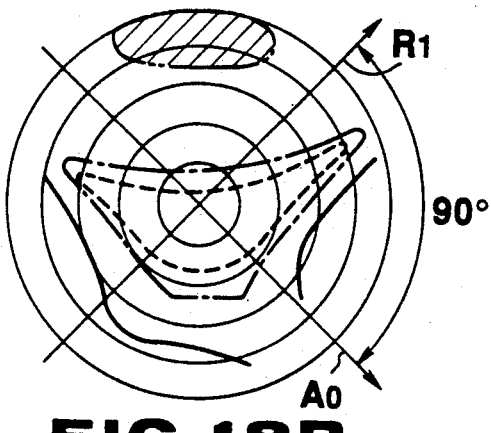
Figure 18C:
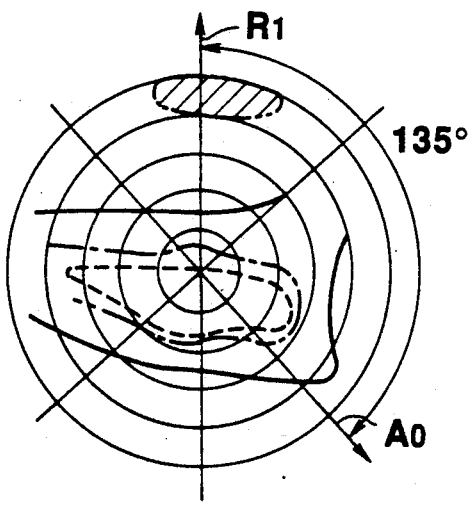

For comparison, equal contrast curves of the cases where the installing angle of the delayed phase axis $R_1$ of the first retardation plate 113 is set to 45°, 90° and 135° under the same conditions as those in FIG. 15A of the second embodiment are shown in FIG. 18A to FIG. 18C.

In comparison with the conventional example shown in FIG. 1, in a case where the installing angle of the delayed phase axis $R_1$ of the first retardation plate 113 is 45°, as shown in FIG. 18A, a region having 50 or more of contrast is extended at 225° of its viewing angle direction, but narrowed in a direction $V_0$ passing through viewing angle directions of 135° and 315°, and an inverted region at 135° of the viewing angle direction is extended, and the viewing angle characteristic is not improved.

In comparison with the conventional example shown in FIG. 1, in a case where the installing angle of the delayed phase axis $R_1$ of the first retardation plate 113 is 90°, as shown in FIG. 18B, a region having 50 or more of contrast is substantially the same, but the inverted region at 135° of the viewing angle direction is extended, and the viewing angle characteristic is not improved.

The case where the installing angle of the delayed phase axis $R_1$ of the first retardation plate 113 is 135° as shown in FIG. 18C corresponds to the case where the first and second retardation plates 113 and 114 are interchanged with each other in the case that the installing angle is 45° as shown in FIG. 18A. In the above described case of FIG. 18C, similarly to the case where the installing angle is 45° as shown in FIG. 18A, the region having 50 or more of contrast is extended at 225° of the viewing angle direction, but narrowed in a direction passing through the 135° and 315° of the viewing angle directions, the inverted region at 135° of the viewing angle direction is extended, and the viewing angle characteristic is not improved.

According to the second embodiment as described above, by arranging the two retardation plates 113 and 114 between the liquid crystal cell 110 and the analyzer 111 or between the polarizer 112 and the liquid crystal cell 110 to cross the delayed phase axes $R_1$ and $R_2$ of the retardation plates 113 and 114 to each other at 90°, and by setting the installing angle of the delayed phase axis $R_1$ of the first retardation plate 113 arranged at the liquid crystal cell 110 side or the polarizer 111 side in a range of $-15°$ to 15° with respect to the rubbing direction $A_0$ of the lower substrate 102 of the light incident side of the liquid crystal cell 110, its viewing angle can be extended, the inverted region can be narrowed, and its viewing angle characteristic is improved.

The measured results of the viewing angle characteristic of the liquid crystal display device are shown in FIG. 19A to FIG. 26C in a case where the installing angle of the delayed phase axis of the first retardation plate 113 is set in a range fron $-15°$ to $+15°$ with respect to the rubbing direction $A_0$ of the lower substrate 102 of the light incident side when the physical properties of the liquid crystal material and the physical properties of the retardation plates are altered.

In these equal contrast curves, the physical properties of the liquid crystal material are so set that the value of dielectric constant ratio $\Delta\epsilon/\epsilon\perp$ is 1.25, the value of elastic constant ratio $K_{33}/K_{11}$ is 1.57, the value of $K_{33}/K_{22}$ is 2.30 and the value of $\Delta nd$ of the liquid crystal layer is 360 nm.

Figure 19A:
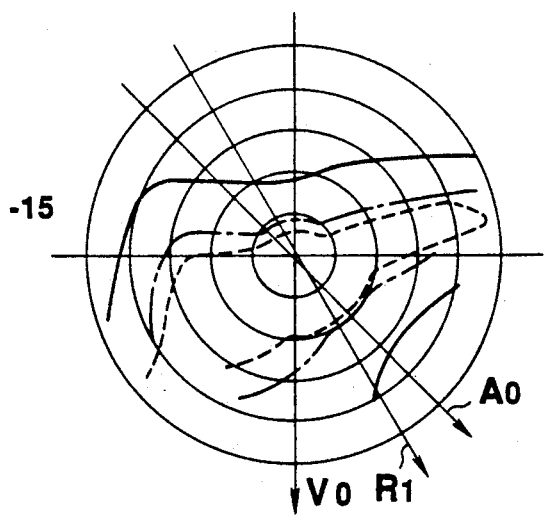
FIGS. 19A to 19C are equal contrast diagrams respectively showing viewing angle characteristics of a liquid crystal display device having the retardation plate arrangement of the second embodiment using a polyvinyl alcohol retardation plate having 300 nm of the value of the product $\Delta nd$ (retardation) of the refractive-index anisotropy $\Delta n$ and the thickness d, wherein the installing angle of the delayed phase axis of one of the retardation plates is changed.
Figure 20A:
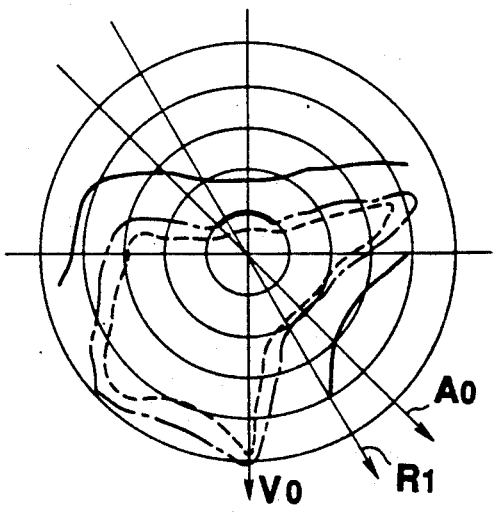
FIGS. 20A to 20C are equal contrast diagrams respectively showing viewing angle characteristics of a liquid crystal display device having the retardation plate arrangement of the second embodiment using a polyvinyl alcohol retardation plate having 400 nm of the value of the product $\Delta nd$ (retardation) of the refractive-index anisotropy $\Delta n$ and the thickness d, wherein the installing angle of the delayed phase axis of one of the retardation plates is changed.
Figure 19B:
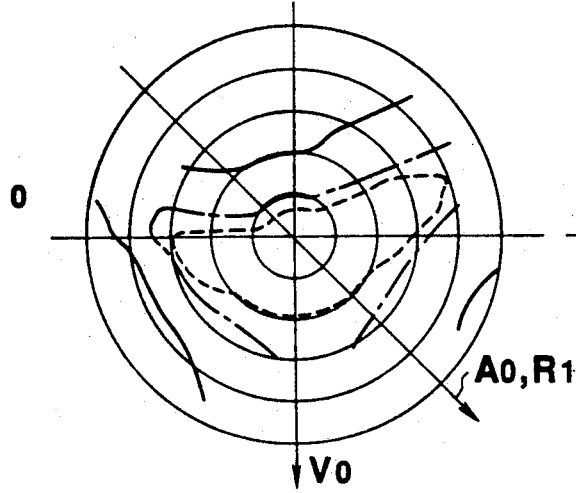
Figure 20B:
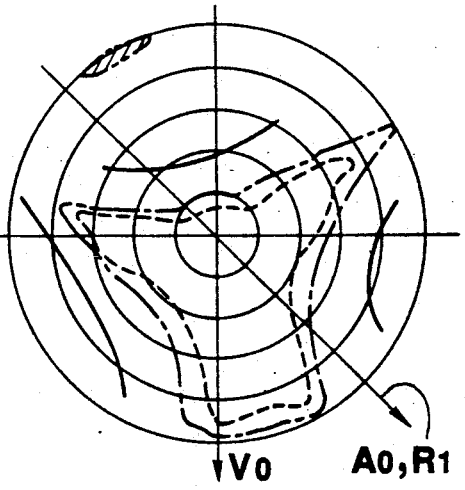
Figure 19C:
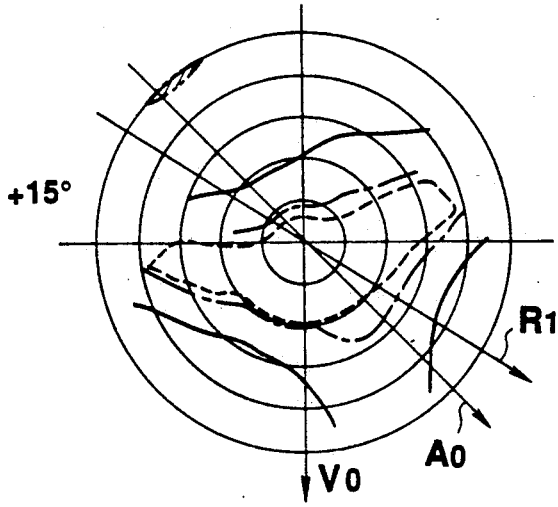
Figure 20C:
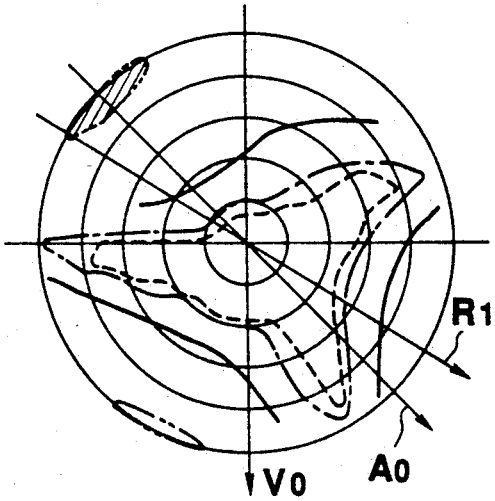
Figures 21A, 22A:
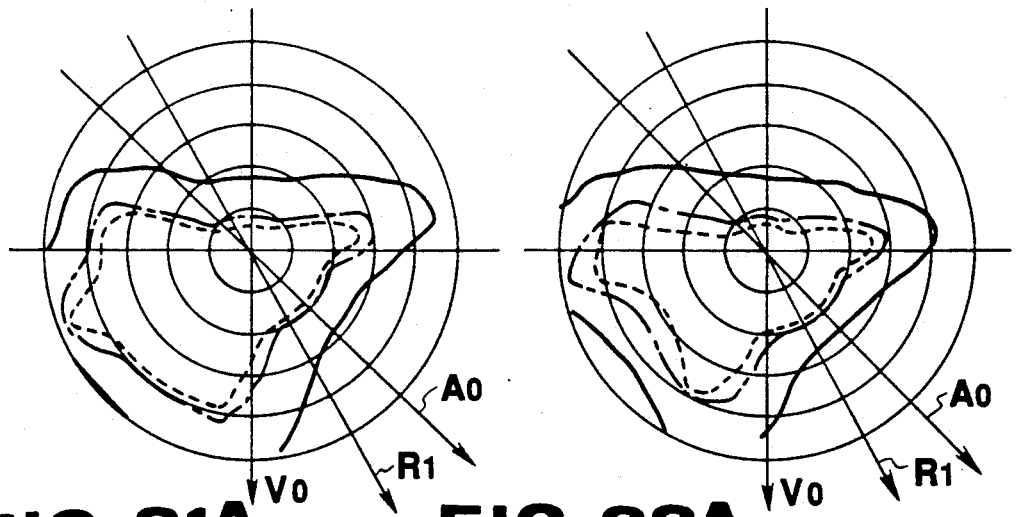
FIGS. 21A to 21C are equal contrast diagrams respectively showing viewing angle characteristics of a liquid crystal display device having the retardation plate arrangement of the second embodiment using a polyvinyl alcohol retardation plate having 500 nm of the value of the product $\Delta nd$ (retardation) of the refractive-index anisotropy $\Delta n$ and the thickness d, wherein the installing angle of the delayed phase axis of one of the retardation plates is changed.
FIGS. 22A to 22C are equal contrast diagrams respectively showing viewing angle characteristics of a liquid crystal display device having the retardation plate arrangement of the second embodiment using a polyvinyl alcohol retardation plate having 600 nm of the value of the product $\Delta nd$ (retardation) of the refractive-index anisotropy $\Delta n$ and the thickness d, wherein the installing angle of the delayed phase axis of one of the retardation plates is changed.
Figures 21B, 22B:
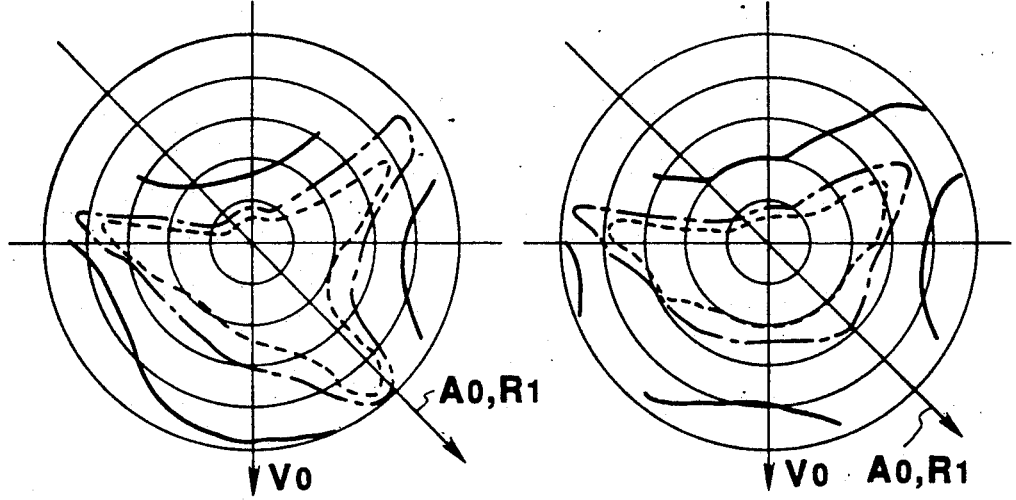
Figures 21C, 22C:
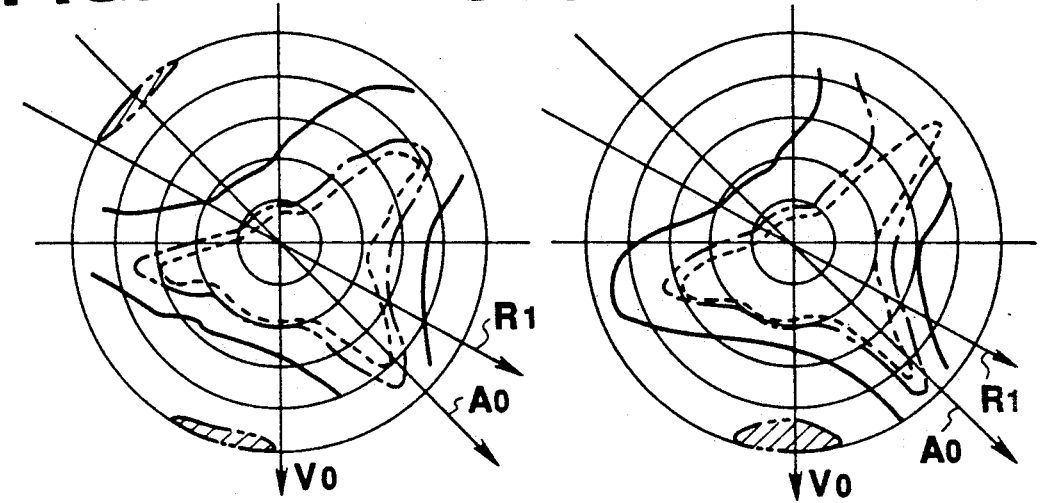

FIG. 19A to FIG. 22C show equal contrast curves of a case where a retardation plate made of PVA (polyvinyl alcohol) is used. FIGS. 19A, 19B and 19C show equal contrast curves of a case where the value of $\Delta nd$ of each of the retardation plates is 300 nm, and the installing angle of the retardation plate is $-15°$, 0° and $+15°$. FIGS. 20A, 20B and 20C show equal contrast curves of a case where the value of $\Delta nd$ of each of the retardation plates is 400 nm, and the installing angle of the retardation plate is $-15°$, 0° and $+15°$. FIGS. 21A, 21B and 21C show equal contrast curves of a case where the value of $\Delta nd$ of each of the retardation plates is 500 nm, and the installing angle of the retardation plate is $-15°$, 0° and $+15°$. FIGS. 22A, 22B and 22C show equal contrast curves of a case where the value of $\Delta nd$ of each of the retardation plates is 600 nm, and the installing angle of the retardation plate is $-15°$, 0° and $+15°$.

Figure 23A:
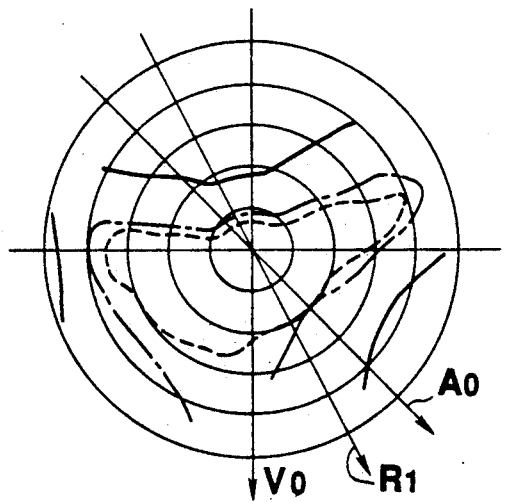
FIGS. 23A to 23C are equal contrast diagrams respectively showing viewing angle characteristics of a liquid crystal display device having the retardation plate arrangement of the second embodiment using a polycarbonate retardation plate having 300 nm of the value of the product $\Delta nd$ (retardation) of the refractive-index anisotropy $\Delta n$ and the thickness d, wherein the installing angle of the delayed phase axis of one of the retardation plates is changed.
Figure 24A:
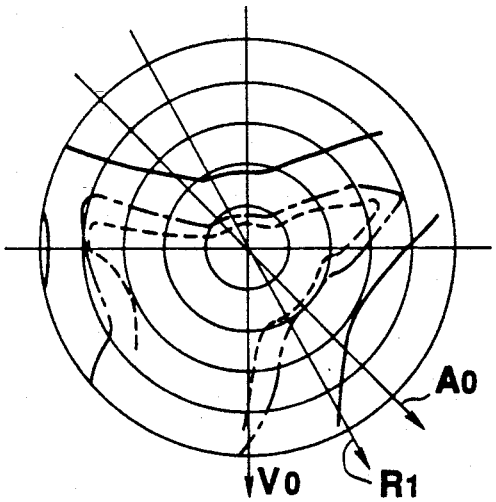
FIGS. 24A to 24C are equal contrast diagrams respectively showing viewing angle characteristics of a liquid crystal display device having the retardation plate arrangement of the second embodiment using a polycarbonate retardation plate having 400 nm of the value of the product $\Delta nd$ (retardation) of the refractive-index anisotropy $\Delta n$ and the thickness d, wherein the installing angle of the delayed phase axis of one of the retardation plates is changed.
Figure 23B:
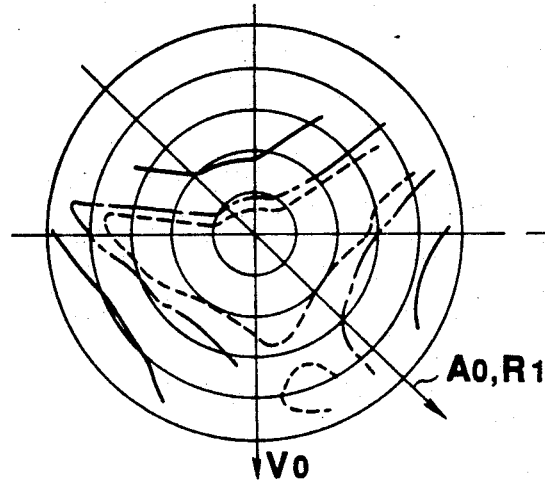
Figure 24B:
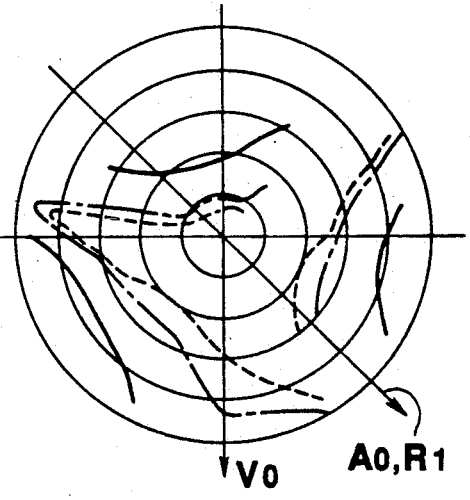
Figure 23C:
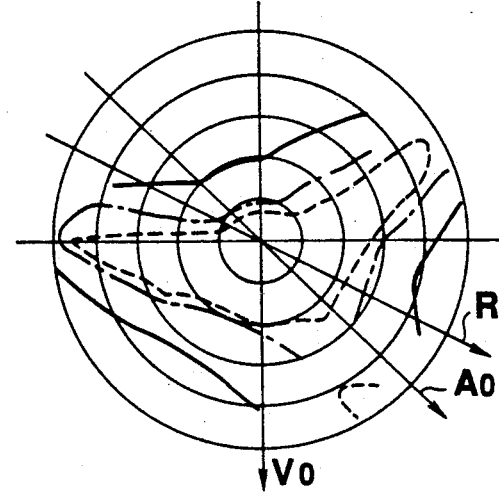
Figure 24C:
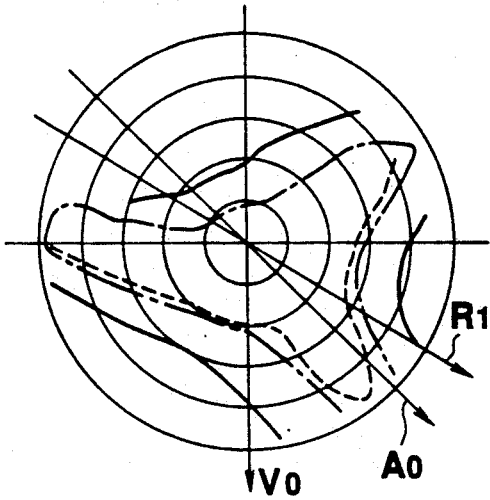

FIG. 23A to FIG. 26C show equal contrast curves in a case where a retardation plate made of PC (polycarbonate) is employed. FIGS. 23A, 23B and 23C show equal contrast curves of a case where the value of $\Delta nd$ of each of the retardation plates is 300 nm, and the installing angle of the retardation plate is $-15°$, 0° and $+15°$. FIGS. 24A, 24B and 24C show equal contrast curves of a case where the value of $\Delta nd$ of each of the retardation plates is 400 nm, and the installing angle of the retardation plate is $-15°$, 0° and $+15°$. FIGS. 25A, 25B and 25C show equal contrast curves of a case where the value of $\Delta nd$ of each of the retardation plates is 500 nm, and the installing angle of the retardation plate is $-15°$, 0° and $+15°$. FIGS. 26A, 26B and 26C show equal contrast curves of a case where the value of $\Delta nd$ of each of the retardation plates is 600 nm, and the installing angle of the retardation plate is $-15°$, 0° and $+15°$.

As is apparent from these equal contrast curves, the region having high contrast is exhibited in the direction $V_0$ of 315° with respect to the rubbing direction $A_0$ of the lower substrate 102 (i.e., at this side of the liquid crystal display device) so that the viewing angle of the viewing angle direction is extended. In the cases where the retardation plates are formed of PVA or PC, all cases exhibit preferable equal contrast characteristics. Therefore, the retardation plates may be formed of PVA or PC. It is preferable that the value of the product $\Delta nd$ of the refractive-index anisotropy $\Delta n$ of the retardation plate and the thickness d thereof is 300 nm to 600 nm when the value of the $\Delta nd$ of the liquid crystal layer is 350 nm to 700 nm.

In FIGS. 27A to 27F, the results that the influence of the refractive index $n_0$ of the ordinary ray in the retardation plate to the equal contrast curve is checked are shown. FIGS. 27A to 27F show equal contrast curves of a case where the installing angle of the retardation plate is 0°, the $\Delta nd$ of the liquid crystal layer 109 of the liquid crystal cell 110 is 375 nm, the $\Delta nd$ of the retardation plate is fixed to 350 nm, and the absolute value of the refractive index of the ordinary ray in the retardation plate is altered, in the second embodiment shown in FIG. 9.

Figure 27A:
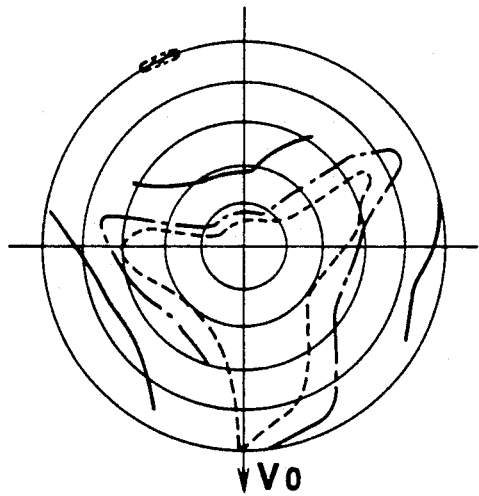
FIGS. 27A to 27F are equal contrast diagrams respectively showing viewing angle characteristics of a liquid crystal display device having the retardation plate arrangement of the second embodiment, wherein the value of the refractive index $n_0$ of an ordinary ray in the retardation plate is changed.
Figure 27D:
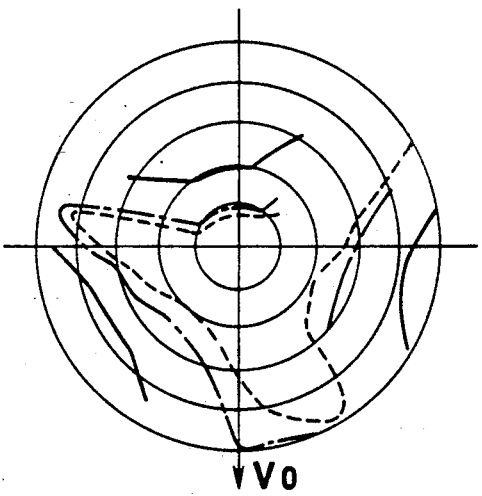
Figure 27B:
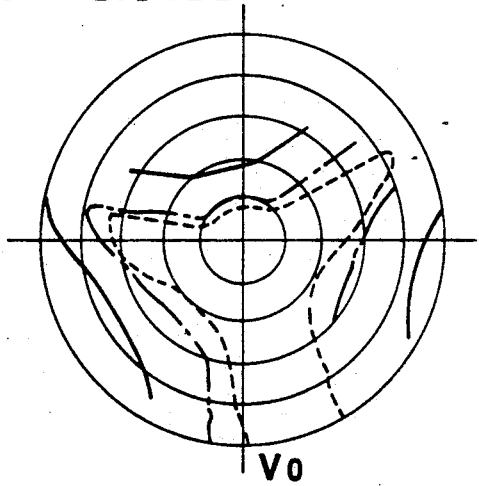
Figure 27E:
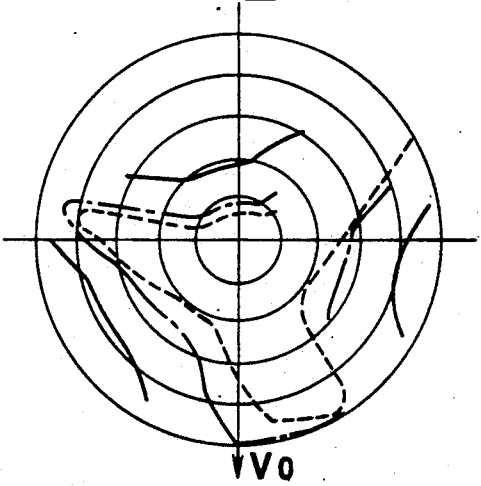
Figure 27C:
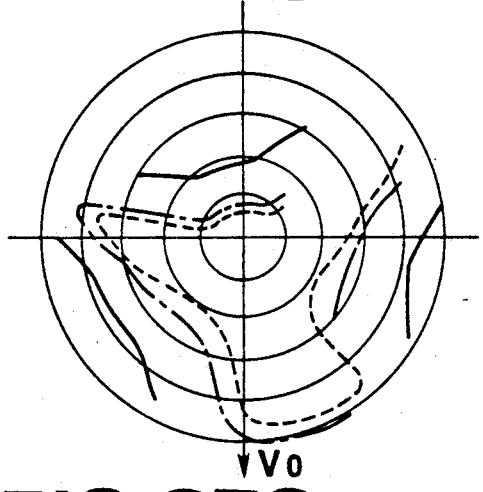
Figure 27F:
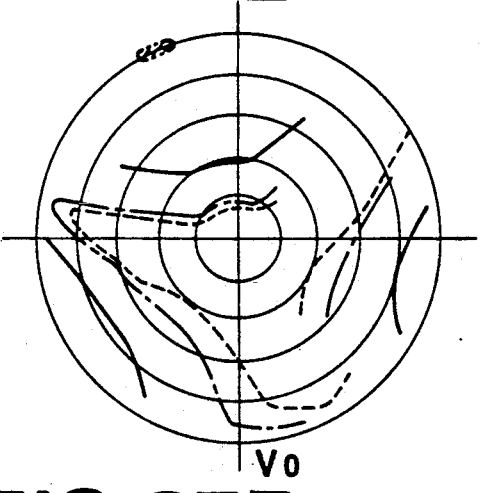

FIG. 27A shows the case that the refractive index $n_0$ of the ordinary ray is 1.2. FIG. 27B shows the case that the refractive index $n_0$ of the ordinary ray is 1.3. FIG. 27C shows the case that the refractive index $n_0$ of the ordinary ray is 1.4. FIG. 27D shows the case that the refractive index $n_0$ of the ordinary ray is 1.5. FIG. 27E shows the case that the refractive index $n_0$ of the ordinary ray is 1.55. FIG. 27F shows the case that the refractive index $n_0$ of the ordinary ray is 1.6.

According to FIGS. 27A to 27F, in the case where the refractive index $n_0$ of the ordinary ray is 1.3, the region having high contrast is extended at this side of the liquid crystal display device (downward direction in FIG. 27). Therefore, when the value of the $\Delta nd$ of the liquid crystal layer is 375 nm and the value of the $\Delta nd$ of the retardation plate is 350 nm, it is preferable that the value of the refractive index $n_0$ of the ordinary ray in the retardation plate is set to 1.3.

Third Embodiment

The present invention achieves the object even by disposing the retardation plates at both sides of the liquid crystal cell. In this case, each of the retardation plates is so disposed that the delayed phase axis or the advanced phase axis crossed the delayed phase axis at 90° is in coincidence with the aligning direction of the lower substrate of the light incident side of the liquid crystal cell. A third embodiment of the present invention will be described in detail by referring to FIG. 28 to FIG. 37. The same members as those of the first embodiment are denoted by the same reference numerals, and the description thereof will be omitted.

Figure 28:
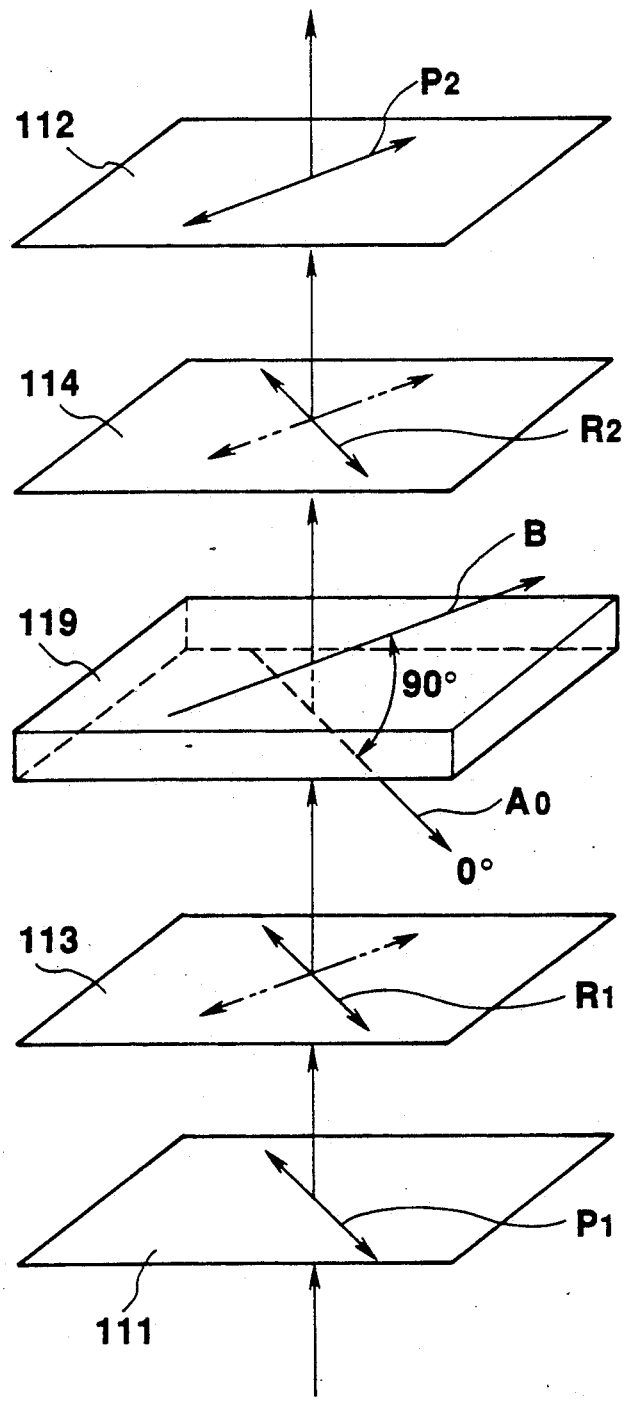
FIG. 28 is a schematic view of an arrangement showing a main portion of a liquid crystal display device according to a third embodiment of the present invention.

As shown in FIG. 28, a polarizer 111 is provided at a light incident side of a liquid crystal layer 109, an analyzer 112 is provided at a light exit side of the liquid crystal layer 109, a first retardation plate 113 is provided between the liquid crystal layer 10 and the polarizer 111, and a second retardation plate 114 is provided between the liquid crystal layer 109 and the analyzer 112. This liquid crystal layer 109 is formed of a liquid crystal having such physical properties that the value of dielectric constant ratio $\Delta\epsilon/\epsilon\perp$ is 2.44, the value of elastic constant ratio $K_3/K_1$ is 1.43, the value of $K_3/K_2$ is 2.50, and the value of the $\Delta$nd is set in a range of 450 nm to 550 nm. The aligning direction of the aligning film of the lower substrate 102 of the light incident side of the liquid crystal layer 109 is a rubbing direction $A_0$ inclined at approximately 45° with respect to the side edge of the liquid crystal cell. The aligning direction of the aligning film of the upper substrate 101 of the light exit side is a rubbing direction B rotated at 90° in a counter-clockwise direction from the rubbing direction $A_0$ of the aligning film of the lower substrate 102 of the light incident side, as seen from the light incident side. Therefore, a liquid crystal 119 sandwiched between the opposed substrates is twisted at substantially 90° in the counterclockwise direction as seen from the light incident side. The value of the d/p of the liquid crystal layer of this case is set to approx. 0.05. The pretilting angle of the liquid crystal molecules is approx. 1°.

The polarizer 111 is so arranged that its polarizing axis such as, for example, a transmission axis $P_1$ is substantially in parallel with the rubbing direction $A_0$. The analyzer 112 is so arranged that its polarizing axis such as, for example, a transmission axis $P_2$ crosses at 90° the transmission axis $P_1$ of the polarizer 111. The first retardation plate 113 is so arranged that its delayed phase axis $R_1$ is in parallel to or crosses at 90° to the rubbing direction $A_0$. The second retardation plate 114 is so arranged that its delayed phase axis $R_2$ is in parallel to or crosses at 90° the rubbing direction $A_0$. These retardation plates 113 and 114 are formed to have the same retardation, and the value of the retardation $\Delta$nd is set in a range of 300 nm to 400 nm. These retardation plates 113 and 114 are formed of the same material such as, for example, a polycarbonate or polyvinyl alcohol, and the outer surfaces thereof are covered with a protective film made of triacetyl cellulose or the like.

When, as in this third embodiment, the liquid crystal cell is sandwiched between the first and second retardation plates 113 and 114, the first and second retardation plates 113 and 114 are disposed so as not to be adjacent to each other, the delayed phase axes $R_1$ and $R_2$ of the first and second retardation plates 113 and 114 are arranged in parallel to or to cross at 90° to each other, and the delayed phase axis $R_1$ of the first retardation plate 113 is arranged in parallel to or to cross at 90° the rubbing direction $A_0$ of the lower substrate 102 of the light incident side of the liquid crystal cell, the contrast observed from the normal direction of the liquid crystal cell is high, and the sharpness of the variation in the transmission rate is preferable when a voltage is applied. Further, the difference of $\Delta$nd of the liquid crystal cell for the light transmitted in the normal direction of the liquid crystal cell and the light transmitted obliquely thereto is compensated so that decreasing of the contrast is prevented when the display surface is observed from the oblique direction, thereby improving the viewing angle characteristic.

In the liquid crystal display device of the arrangement described above, the contrasts observed from all the directions are measured in the four cases where the value of the $\Delta$nd of the liquid crystal layer 109 is set to 510 nm (the value measured by the light having a wavelength of 589 nm), the value of the $\Delta$nd of each of the retardation plates 113 and 114 is set to 350 nm (the value measured by the light having a wavelength of 589 nm), the delayed phase axis $R_1$ of the first retardation plate 113 is arranged in parallel to or to cross at 90° to the rubbing direction $A_0$ of the lower substrate 102 of the light incident side of the liquid crystal cell, and the delayed phase axis $R_2$ of the second retardation plate 114 is arranged in parallel to or to cross at 90° to the rubbing direction $A_0$ of the lower substrate 102 of the light incident side of the liquid crystal cell. The results are shown as equal contrast curve diagrams in FIG. 29A to FIG. 29D. The equal contrast diagrams of FIG. 29A to FIG. 29D are defined in the same manner as the first embodiment.

Figure 29A:
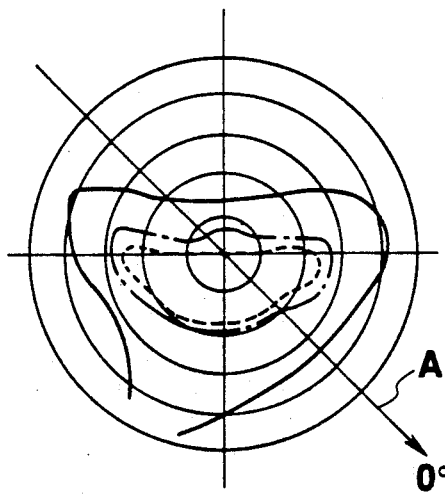
FIGS. 29A to 29D are equal contrast diagrams respectively showing viewing angle characteristics of a liquid crystal display device having the retardation plate arrangement of the third embodiment, wherein the installing angle of the delayed phase axis of one of the retardation plates is changed.

FIG. 29A shows an equal contrast curve of a case where the delayed phase axes $R_1$ and $R_2$ of the first and second retardation plates 113 and 114 are disposed together in parallel to the rubbing direction $A_0$. In this case, in comparison with the conventional example shown in FIG. 1, an inverted region in which light and shade are inverted is not exhibited, and a region having 10 or more of contrast surrounded by a solid line is substantially the same, thereby improving the viewing angle characteristic.

Figure 29B:
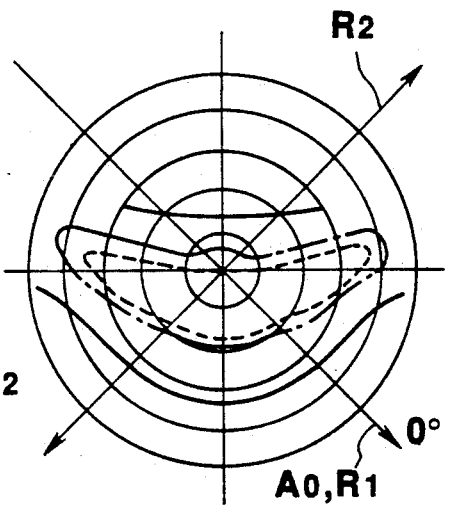

FIG. 29B shows an equal contrast curve of a case where the delayed phase axis $R_1$ of the first retardation plate 113 is disposed in parallel to the rubbing direction $A_0$ and the delayed phase axis $R_2$ of the second retardation plate 114 is disposed to cross at 90° to the rubbing direction A. In this case, in comparison with the conventional example shown in FIG. 1, an inverted region is not exhibited and a region having 10 or more of contrast surrounded by a solid line is extended laterally in the liquid crystal cell, thereby improving viewing angle characteristics.

Figure 29C:
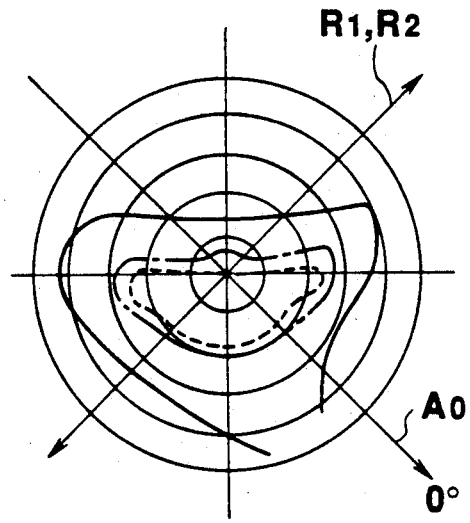

FIG. 29C shows an equal contrast curve of a case where the delayed phase axes $R_1$ and $R_2$ of the first and second retardation plates 113 and 114 are arranged to cross at 90° to each other. In this case, the equal contrast curve of FIG. 29A is exhibited substantially by a mirror-symmetry with respect to a vertical line in FIG. 29C. Therefore, similarly to the case shown in FIG. 29A, an inverted region is not exhibited and a region having 10 or more of contrast surrounded by a solid line is substantially the same, thereby improving its viewing angle characteristics.

Figure 29D:
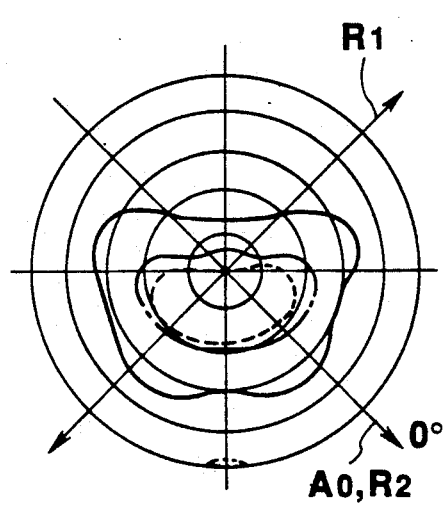

FIG. 29D shows an equal contrast curve of a case where the delayed phase axis $R_1$ of the first retardation plate 113 is arranged to cross at 90° to the rubbing direction $A_0$ and the delayed phase axis $R_2$ of the second retardation plate 114 is arranged in parallel thereto. In this case, in comparison with the conventional example shown in FIG. 1, a region having 10 or more of contrast surrounded by a solid line is entirely slightly narrowed, a small inverted region surrounded by a two-dot chain line is exhibited at a lower portion in the liquid crystal cell, but the inverted region is narrow, thereby improving its viewing angle characteristic.

As described above, when the delayed phase axis $R_1$ of the first retardation plate 113 is arranged in parallel to or to cross at 90° to the rubbing direction $A_0$ and the delayed phase axis $R_2$ of the second retardation plate 114 is arranged in parallel to or to cross at 90° to the rubbing direction $A_0$, the inverted region exhibited in the vertical direction of the liquid crystal display device can be extremely reduced, or the whole inverted region is entirely eliminated, thereby improving the viewing angle characteristic.

In FIG. 30A to FIG. 33B, the results of measurements of the electro-optical characteristic and the degree of coloring of the transmission light in ON and OFF states in the cases where the first and second retardation plates 113 and 114 are disposed as described above are shown. FIG. 30A and FIG. 30B show a relationship between voltage and transmittance in the liquid crystal display device corresponding to FIG. 29A, and CIE chromaticity diagram of the transmitted light in the device. FIG. 31A and FIG. 31B show a relationship between voltage and a transmittance in the liquid crystal display device corresponding to FIG. 29B, and CIE chromaticity diagram of the transmitted light in the device. FIG. 32A and FIG. 32B show a relationship between voltage and transmittance in the liquid crystal display device corresponding to FIG. 29C, and CIE chromaticity diagram of the transmitted light in the device. FIG. 33A and FIG. 33B show a relationship between voltage and transmittance in the liquid crystal display device corresponding to FIG. 29D, CIE chromaticity diagram of the transmitted light in the device.

Figure 2:
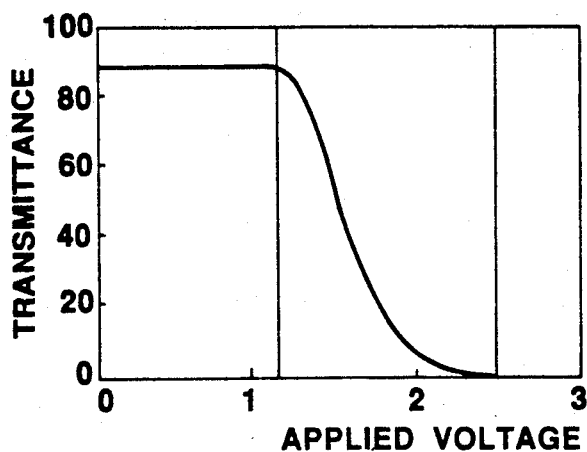
FIG. 2 is a voltage-transmittance characteristic diagram of the conventional liquid crystal display device.
Figure 3:
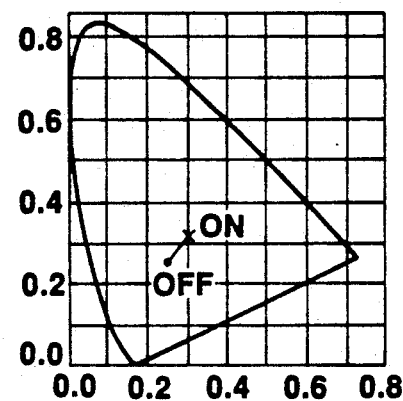
FIG. 3 is a CIE chromaticity diagram showing change in displayed chromaticity of the conventional liquid crystal display device.

On the other hand, FIG. 2 and FIG. 3 respectively show a relationship between voltage and transmittance in the conventional liquid crystal display device shown in FIG. 1, and CIE chromaticity diagram of the transmitted light in the device.

As apparent from these drawings, the liquid crystal display device of the embodiment using the retardation plates provides high transmittance in the ON state when the liquid crystal cell is operated, and abrupt change in the transmittance corresponding to the applied voltage. Further, as shown in the CIE chromaticity diagram, the liquid crystal display device is not chromatic in the ON state, and the degree of coloring in the OFF state is extremely small. Therefore, according to this embodiment, black and white display with excellent abrupt change in the transmittance corresponding to the applied voltage and without coloring is provided.

In the liquid crystal display device of the arrangement shown in FIG. 28, the measured results of the contrasts observed in all directions are shown in FIG. 34A to FIG. 36C in the cases where the value of $\Delta nd$ of the liquid crystal layer 109 is set to 360 nm (the value measured by a light having a wavelength of 589 nm), the value of $\Delta nd$ of each of the retardation plates 113 and 114 is set to 300 nm, 350 nm and 400 nm (the value measured by a light having a wavelength of 589 nm), the delayed phase axes $R_1$ and $R_2$ of the first and second retardation plates 113 and 114 are arranged in parallel to or to cross at 90° to the rubbing direction $A_0$.

Figure 34A:
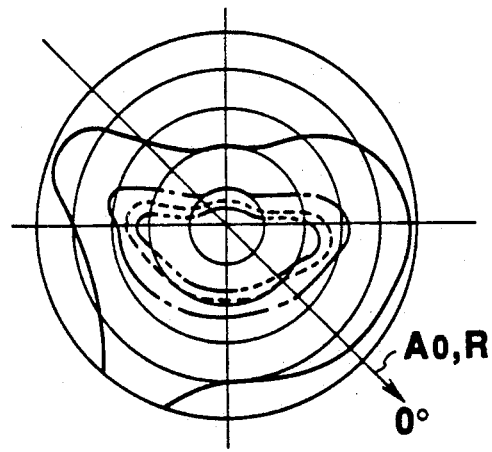
FIGS. 34A to 34C are equal contrast diagrams respectively showing viewing angle characteristics of a liquid crystal display device having the retardation plate arrangement of the third embodiment using a retardation plate having 300 nm of the value of the product $\Delta nd$ (retardation) of the refractive-index anisotropy $\Delta n$ and the thickness d, wherein the installing angle of the delayed phase axis of one of the retardation plates is changed.
Figure 35A:
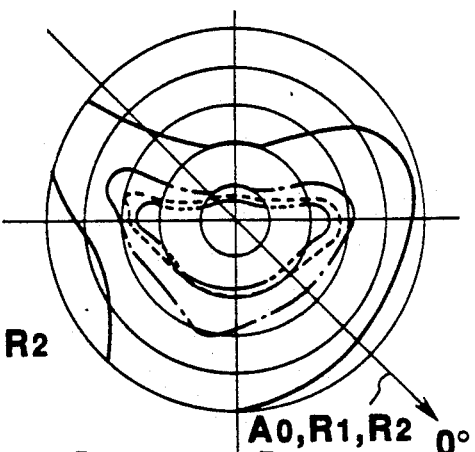
FIGS. 35A to 35C are equal contrast diagrams respectively showing viewing angle characteristics of a liquid crystal display device having the retardation plate arrangement of the third embodiment using a retardation plate having 350 nm of the value of the product $\Delta nd$ (retardation) of the refractive-index anisotropy $\Delta n$ and the thickness d, wherein the installing angle of the delayed phase axis of one of the retardation plates is changed.
Figure 34B:
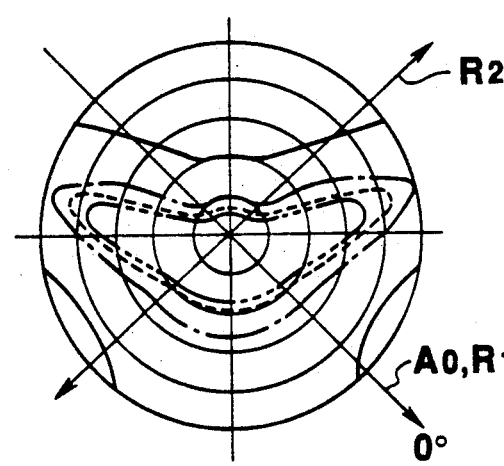
Figure 35B:
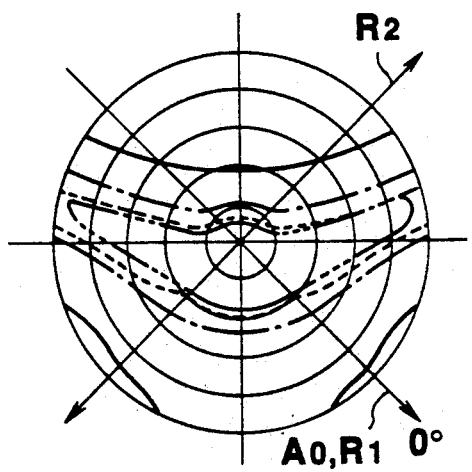
Figure 34C:
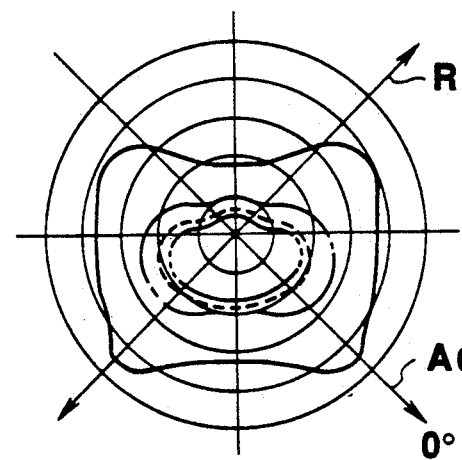
Figure 35C:
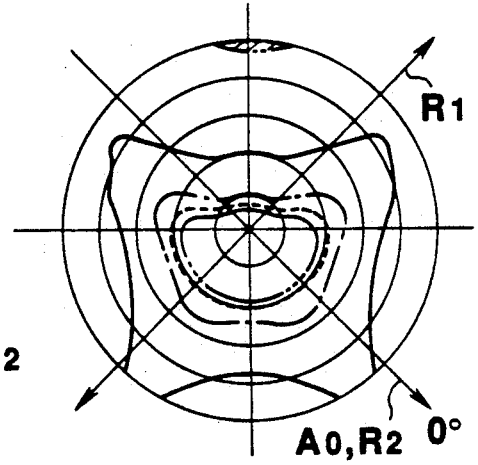
Figure 36A:
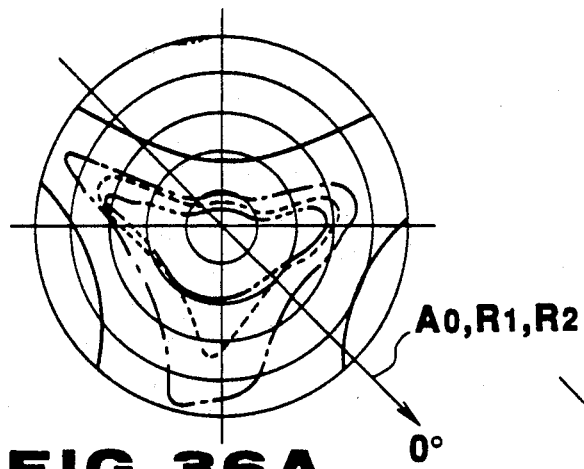
FIGS. 36A to 36C are equal contrast diagrams respectively showing viewing angle characteristics of a liquid crystal display device having the retardation plate arrangement of the third embodiment using a retardation plate having 400 nm of the value of the product $\Delta nd$ (retardation) of the refractive-index anisotropy $\Delta n$ and the thickness d, wherein the installing angle of the delayed phase axis of one of the retardation plates is changed.
Figure 36B:
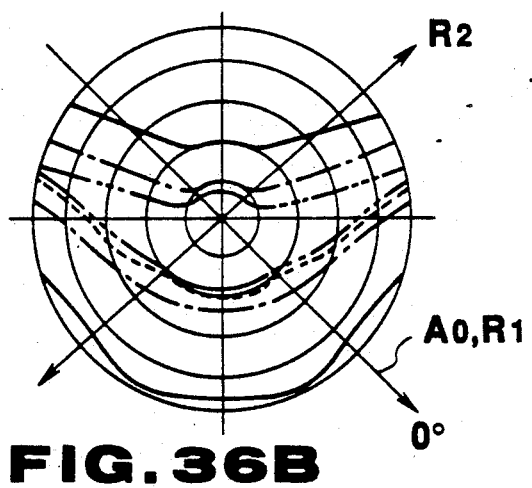
Figure 37:
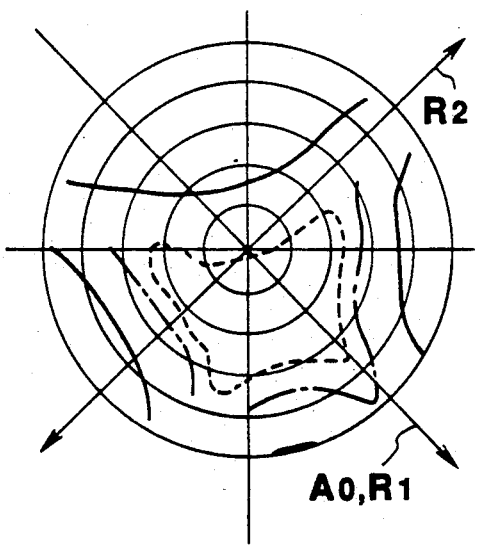
FIG. 37 is an equal contrast diagram showing a viewing angle characteristic of a liquid crystal display device having the retardation plate arrangement of the third embodiment when the value of the product $\Delta nd$ of the refractive-index anisotropy $\Delta n$ and the thickness d is a value obtained by multiplying the value of the $\Delta nd$ of a liquid crystal phase by 0.85 to 0.95.
Figure 36C:
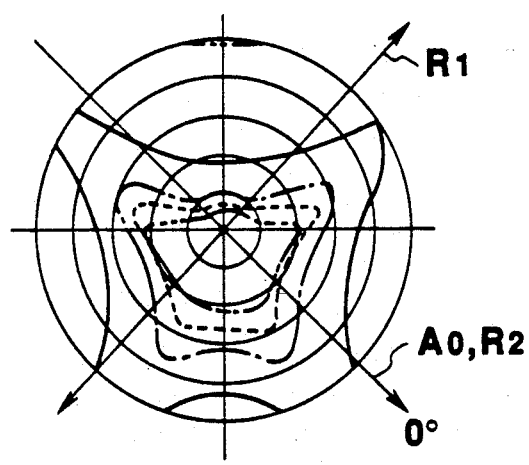

FIG. 34A is an equal contrast curve diagram in the case where the value of $\Delta nd$ of each of the retardation plates is 300 nm, and the delayed phase axes $R_1$ and $R_2$ of the first and second retardation plates 113 and 114 are arranged in parallel to the rubbing direction $A_0$. FIG. 34B is an equal contrast curve diagram in the case where the value of $\Delta nd$ of each of the retardation plates is 300 nm, the delayed phase axis $R_1$ of the first retardation plate 113 is arranged in parallel to the rubbing direction $A_0$ and the delayed phase axis $R_2$ of the second retardation plate 114 is arranged to cross at 90° to the rubbing direction $A_0$. FIG. 34C is an equal contrast curve diagram in the case where the value of $\Delta nd$ of each of the retardation plates is 300 nm, and the delayed phase axis $R_1$ of the first retardation plate 113 is arranged to cross at 90° the rubbing direction $A_0$ and the delayed phase axis $R_2$ of the second retardation plate 114 is arranged in parallel thereto. FIG. 35A is an equal contrast curve diagram in the case where the value of $\Delta nd$ of each of the retardation plates is 350 nm, and the delayed phase axes $R_1$ and $R_2$ of the first and second retardation plates 113 and 114 are arranged in parallel to the rubbing direction $A_0$. FIG. 35B is an equal contrast curve diagram in the case where the value of $\Delta nd$ of each of the retardation plates is 350 nm, the delayed phase axis $R_1$ of the first retardation plate 113 is arranged in parallel to the rubbing direction $A_0$ and the delayed phase axis $R_2$ of the second retardation plate 114 is arranged to cross at 90° to the rubbing direction $A_0$. FIG. 35C is an equal contrast curve diagram in the case where the value of $\Delta nd$ of each of the retardation plates is 350 nm, and the delayed phase axis $R_1$ of the first retardation plate 113 is arranged to cross at 90° to the rubbing direction $A_0$ and the delayed phase axis $R_2$ of the second retardation plate 114 is arranged in parallel thereto. FIG. 36A is an equal contrast curve diagram in the case where the value of $\Delta nd$ of each of the retardation plates is 400 nm, and the delayed phase axes $R_1$ and $R_2$ of the first and second retardation plates 113 and 114 are arranged in parallel to the rubbing direction $A_0$. FIG. 36B is an equal contrast curve diagram in the case where the value of $\Delta nd$ of each of the retardation plates is 400 nm, the delayed phase axis $R_1$ of the first retardation plate 113 is arranged in parallel to the rubbing direction $A_0$ and the delayed phase axis $R_2$ of the second retardation plate 114 is arranged to cross at 90° to the rubbing direction $A_0$. FIG. 36C is an equal contrast curve diagram in the case where the value of $\Delta nd$ of each of the retardation plates is 400 nm, the delayed phase axis $R_1$ of the first retardation plate 113 is arranged to cross at 90° to the rubbing direction $A_0$, and the delayed phase axis $R_2$ of the second retardation plate 114 is arranged in parallel thereto. Even if the value of the $\Delta nd$ of each of the retardation plates is any of 300, 350 and 400 nm, in the case where the delayed phase axes $R_1$ and $R_2$ of the first and second retardation plates 113 and 114 are arranged to cross at 90° to the rubbing direction of the substrate of the light incident side of the liquid crystal cell, the contrast curves of FIG. 34A, FIG. 35A and FIG. 36A are exhibited substantially in a mirror-symmetry with respect to the vertical line on the drawings, and hence the illustrations thereof are omitted. The physical properties of the liquid crystal of this case are so set that the value of dielectric constant ratio $\Delta\epsilon/\epsilon_\perp$ is 1.35, elastic constant ratio $K_3/K_1$ is 1.57, and $K_3/K_2$ is 2.30. In FIG. 34A to FIG. 36C, a three-dot chain line shows contrast 150.

As is apparent from these drawings, in comparison with the conventional example shown in FIG. 1, in all the cases, the inverted region exhibited in the vertical direction in the liquid crystal cell can be extremely reduced, or the whole inverted region is entirely eliminated, thereby improving its viewing angle characteristic. In the case of each of FIG. 34A, FIG. 35A, FIG. 35C, FIG. 36A and FIG. 36C, the region having 50 or more of contrast surrounded by the one-dot chain line is extended downward in the liquid crystal cell. In the case of each of FIG. 34B, FIG. 35B and FIG. 36B, the region having 50 or more of contrasts surrounded by the one-dot chain line is extended laterally in the liquid crystal cell, thereby improving the viewing angle characteristic. The larger the value of the $\Delta nd$ of each of the retardation plates is, the wider the region having high contrast is extended. Therefore, it is preferable that the value of the Δnd of each of the retardation plates is larger and the value is in a range of 300 nm to 600 nm.

It is also preferable that the value of the Δnd of the liquid crystal cell is in a range of 350 nm to 700 nm, and particularly the smaller the value is, the better the viewing angle characteristic becomes. Therefore, it is preferable that the value of the Δnd of the liquid crystal cell is 550 nm or less, and particularly approx. 360 nm.

In the arrangement of the retardation plates shown in FIG. 29B, in a case where the value of the Δnd of the liquid crystal layer is set in a range of 350 nm to 400 nm and the value of the Δnd of each of the retardation plates is set in a range of 300 nm to 380 nm, as shown in FIG. 29B, the viewing angle in the vertical direction in the liquid crystal display device is extended. Therefore, in the arrangement of the retardation plates shown in FIG. 29B, the value of the Δnd of each of the retardation plates is preferably set in a range of the values obtained by multiplying the value of the Δnd of the liquid crystal layer by 0.85 to 0.95.

According to the third embodiment as described above, by providing the first retardation plate between the liquid crystal cell and the polarizer and providing the second retardation plate between the liquid crystal cell and the analyzer, the inverted region is not exhibited or, even if the inverted region is exhibited, it can be extremely reduced, thereby improving the viewing angle characteristic.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:
   a first substrate, on one surface of which at least one first electrode and a first aligning film covering said first electrode are formed, said first aligning film covering at least a portion of said one surface of said first substrate and being executed by an aligning treatment in a predetermined first direction;
   a second substrate, on one surface of which a plurality of second electrodes and a second aligning film covering said second electrodes are formed, said second aligning film covering at least a portion of said one surface of said second substrate and being executed by an aligning treatment in a second direction substantially perpendicular to the first direction of the first aligning film of said first substrate;
   a seal member for bonding said first substrate to said second substrate with a predetermined gap therebetween so tat the first electrode on said first substrate is opposed to the second electrodes on said second substrate;
   a liquid crystal contained in a region defined by said first substrate, said second substrate and said seal member, and forming a liquid crystal layer in the region, liquid crystal molecules of said liquid crystal being a aligned in a state such that they are twisted at substantially 90°, and said liquid crystal layer having refractive-index anisotropy Δn and a liquid crystal layer thickness d such that the value of a product Δn·d of the refractive-index anisotropy Δn and the liquid crystal thickness d of the liquid crystal is from 300 nm to 600 nm;
   a pair of polarizing plates disposed outside of said first substrate and said second substrate to sandwich the substrates therebetween, a polarizing axis of a first of said polarizing plates being directed toward a direction perpendicular to or parallel to said first direction of the first aligning film of said first substrate, and a polarizing axis of a second of said polarizing plates being directed to cross at substantially a right angle to said first of said polarizing plates;
   only one retardation plate disposed between said pair of polarizing plates so that a direction of one of an advanced phase axis and a delayed phase axis thereof is equal to said first direction of the first aligning film of said first substrate or different from said first direction within a range from −15° to +15°, and said one retardation plate having a refractive-index anisotropy Δn and a thickness d such that the product Δn·d of the refractive-index anisotropy Δn and the thickness d is from 300 nm to 500 nm.

2. A liquid crystal display device according to claim 1, wherein said retardation plate is disposed between said pair of polarizing plates so that the direction of said advanced phase axis becomes substantially equal to said first direction.

3. A liquid crystal display device according to claim 2, wherein said retardation plate is disposed so that said delayed phase axis is directed toward a direction perpendicular to the aligning direction of said aligning film provided on the substrate adjacent to the retardation plate, and said retardation plate has a value of Δn·d in a range of 300 nm to 500 nm.

4. A liquid crystal display device according to claim 3, wherein the value of Δn·d of said liquid crystal layer is about 380 nm, and the value of Δn·d of said retardation plate is 350 nm.

5. A liquid crystal display device according to claim 2, wherein said retardation plate comprises polyvinyl alcohol.

6. A liquid crystal display device according to claim 2, wherein said retardation plate comprises polycarbonate.

7. A liquid crystal display device comprising:
   a first substrate, on one surface of which at least one first electrode and a first aligning film covering said first electrode are formed, said first aligning film covering at least a portion of said one surface of said first substrate and being executed by an aligning treatment in a predetermined first direction;
   a second substrate, on one surface of which a plurality of second electrodes and a second aligning film covering said second electrodes are formed, said second aligning film covering at least a portion of said one surface of said second substrate and being executed by an aligning treatment in a second direction substantially perpendicular to the first direction of the first aligning film of said first substrate;
   a seal member for bonding said first substrate to said second substrate with a predetermined gap therebetween so that the first electrode on said first substrate is opposed to the second electrodes on said second substrate;
   a liquid crystal contained in a region defined by said first substrate, said second substrate and said seal member, and forming a liquid crystal layer in the region, liquid crystal molecules of said liquid crystal being aligned in a state such that they are twisted at substantially 90°, and said liquid crystal layer having a refractive-index anisotropy $\Delta n$ and a liquid crystal layer thickness d such that the value of a product $\Delta n \cdot d$ of the refractive-index anisotropy $\Delta n$ and the liquid crystal layer thickness d of the liquid crystal is from 350 nm to 700 nm;

a pair of polarizing plates disposed outside of said first substrate and said second substrate to sandwich the substrates therebetween, a polarizing axis of a first of said polarizing plates being directed toward a direction perpendicular to or parallel to said first direction of the first aligning film of said first substrate, and a polarizing axis of a second of said polarizing plates being directed to cross at substantially a right angle to said first of said polarizing plates;

a first retardation plate disposed between one of said pair of first and second polarizing plates and said first substrate so that a direction of one of an advanced phase axis and a delayed phase axis thereof is equal to said first direction of the first aligning film of said first substrate or different from said direction within a range from $-15°$ to $+15°$, and said first retardation plate having a refractive-index anisotropy $\Delta n$ and a thickness d such that the product $\Delta n \cdot d$ of the refractive-index anisotropy $\Delta n$ and the thickness d is from 300 nm to 600 nm; and a second retardation plate disposed between said first substrate and one of said pair of first and second polarizing plates adjacent to said first retardation plate so that a direction of a delayed phase axis thereof substantially coincides with a direction perpendicular to the direction of the delayed phase axis of said first retardation plate, and said second retardation plate having a refractive-index anisotropy $\Delta n$ and a thickness d such that the product $\Delta n \cdot d$ of the refractive-index anisotropy $\Delta n$ and the thickness d is in a range from 300 nm to 600 nm.

8. A liquid crystal display device according to claim 7, wherein said liquid crystal has a value of $\Delta n \cdot d$ in a range of 450 nm to 550 nm, and said first a second retardation plates respectively have values of $\Delta n \cdot d$ equal to each other in a range of 300 nm to 400 nm.

9. A liquid crystal display device according to claim 7, wherein the value of $\Delta n \cdot d$ of said liquid crystal layer is about 350 nm, and the values of $\Delta n \cdot d$ of said first and second retardation plates are respectively 400 nm.

10. A liquid crystal display device according to claim 7, wherein said first and second retardation plates comprise polyvinyl alcohol.

11. A liquid crystal display device according to claim 7, wherein said both retardation plates are formed of polycarbonate.

12. A liquid crystal display device according to claim 7, wherein said first and second retardation plates are disposed at a light exit side of said liquid crystal display device.

13. A liquid crystal display device according to claim 7, wherein said first and second retardation plates are disposed at a light incident side of said liquid crystal display device.

14. A liquid crystal display device according to claim 7, wherein the value of $\Delta n \cdot d$ of said crystal layer is about 375 nm, the value of $\Delta n \cdot d$ of said pair of said retardation plates are respectively 350 nm, and the value of the refractive index $n_0$ of an ordinary ray in said retardation plates is about 1.3.

15. A liquid crystal display device according to claim 7, wherein the value of $\Delta n \cdot d$ of said liquid crystal layer is about 510 nm, and the values of $\Delta n \cdot d$ of said pair of retardation plates are respectively 350 nm.

16. A liquid-crystal display device comprising:

a first substrate, on one surface of which at least one first electrode and a first aligning film covering said first electrode are formed, said first aligning film covering at least a portion of said one surface of said first substrate and being executed by an aligning treatment in a predetermined first direction;

a second substrate, on one surface of which a plurality of second electrodes and a second aligning film covering said second electrodes are formed, said second aligning film covering at least a portion of said one surface of said second substrate and being executed by an aligning treatment in a second direction substantially perpendicular to the first direction of the first aligning film of said first substrate;

a seal member for bonding said first substrate to said second substrate with a predetermined gap therebetween so that the first electrode on said first substrate is opposed to the second electrodes on said second substrate;

a liquid crystal contained in a region defined by said first substrate, said second substrate and said seal member, and forming a liquid crystal layer in the region, liquid crystal molecules of said liquid crystal being aligned in a state such that they are twisted at substantially 90°, and said liquid crystal layer having a refractive-index anisotropy $\Delta n$ and a liquid crystal layer thickness d such that the value of a product $\Delta n \cdot d$ of the refractive-index anisotropy $\Delta n$ and the liquid crystal layer thickness d of the liquid crystal is from 350 nm to 700 nm;

a pair of polarizing plates disposed outside of said first substrate and said second substrate to sandwich the substrates therebetween, a polarizing axis of a first of said polarizing plates being directed toward a direction perpendicular to or parallel to said first direction of the first aligning film of said first substrate, and a polarizing axis of a second of said polarizing plates being directed to cross as substantially a right angle to said first of said polarizing plates;

a first retardation plate disposed between one of said pair of first and second polarizing plates and said first substrate so that a direction of one of an advanced phase axis and a delayed phase axis thereof is equal to said first direction of the first aligning film of said first substrate or different from said direction within a range from $-15°$ to $+15°$, and said first retardation plate having a refractive-index anisotropy $\Delta n$ and a thickness d such that the product $\Delta n \cdot d$ of the refractive-index anisotropy $\Delta n$ and the thickness d is from 300 nm to 600 nm; and a second retardation plate disposed between the other of said pair of first and second polarizing plates and said second substrate so that a direction of a delayed phase axis thereof substantially coincides with a direction perpendicular to the direction of the delayed phase axis of said first retardation plate, and said second retardation plate having a refractive-index anisotropy $\Delta n$ and a thickness d such that the product $\Delta n \cdot d$ of the refractive-index anisotropy Δn and the thickness d is in a range from 300 nm to 600 nm.

17. A liquid crystal display device according to claim 16, wherein each of said first and second retardation plates is disposed to direct the delayed phase axis thereof in a direction substantially coincident with a direction of a transmission axis of said polarizing plate adjacent to each of said first and second retardation plates, and the value of Δn·d of each of said retardation plates is selected to be in a range of values obtained by multiplying the value of Δn·d of said liquid crystal layer by a factor within a range of 0.85 to 0.95.

18. A liquid crystal display device according to claim 17, wherein the value of Δn·d of said liquid crystal layer is in a range of 350 to 400 nm.

19. An active matrix liquid crystal display device having thin film transistors, comprising:
- a first substrate, on one surface of which at least one common electrode and a first aligning film covering said first electrode are formed, said first aligning film covering at least a portion of said one surface of said first substrate and being executed by an aligning treatment in a predetermined first direction;
- a second substrate, on one surface of which are formed a plurality of pixel electrodes, a plurality of thin film transistors, and a second aligning film covering said pixel electrodes and said thin film transistors, said thin film transistors being connected to said pixel electrodes and operated by a scanning signal and a data signal to be supplied from a scanning line and a data line of said pixel electrodes, said second aligning film covering at least a portion of said one surface of said second substrate and being executed by an aligning treatment in a second direction substantially perpendicular to the first direction of the first aligning film of said first substrate;
- a seal member for bonding said first substrate to said second substrate with a predetermined gap therebetween so that the common electrode on said first substrate is opposed to the pixel electrodes on said second substrate;
- a liquid crystal contained in a region defined by said first substrate, said second substrate and said seal member, and forming a liquid crystal layer in the region, liquid crystal molecules of said liquid crystal being aligned in a state such that they are twisted substantially 90°, and said liquid crystal layer having a refractive-index anisotropy Δn and a liquid crystal layer thickness d such that the value of a product Δn·d of the refractive-index anisotropy Δn and the liquid crystal layer thickness d of the liquid crystal is from 350 nm to 700 nm;
- a pair of polarizing plates disposed outside of said first substrate and said second substrate to sandwich the substrates therebetween, a polarizing axis of a first of said polarizing plates being directed toward a direction perpendicular to or parallel to said first direction of the first aligning film of said first substrate, and a polarizing axis of a second of said polarizing plates being directed to cross at substantially a right angle to said first of said polarizing plates;
- a first retardation plate disposed between one of said pair of first and second polarizing plates and said first substrate so that a direction of a delayed phase axis thereof is equal to said first direction of the first aligning film of said first substrate or different from said first direction within a range from −15° to +15°, and said first retardation plate having a refractive-index anisotropy Δn and a thickness d such that the product Δn·d of the refractive-index anisotropy Δn and the thickness d is from 300 nm to 600 nm; and
- a second retardation plate disposed between the other of said pair of first and second polarizing plates and said second substrate so that a direction of a delayed phase axis thereof is substantially perpendicular to the direction of the delayed phase axis of said first retardation plate, and said second retardation plate having a refractive-index anisotropy Δn and a thickness d such that the product Δn·d of the refractive-index anisotropy Δn and the thickness d is substantially equal to the value of Δn·d of said first retardation plate.

* * * * *